US008121176B2

(12) United States Patent
Guess et al.

(10) Patent No.: US 8,121,176 B2
(45) Date of Patent: *Feb. 21, 2012

(54) ITERATIVE INTERFERENCE CANCELER FOR WIRELESS MULTIPLE-ACCESS SYSTEMS WITH MULTIPLE RECEIVE ANTENNAS

(75) Inventors: Tommy Guess, Lafayette, CO (US); Michael L. McCloud, Boulder, CO (US); Vijay Nagarajan, Boulder, CO (US); Gagandeep Singh Lamba, Thornton, CO (US)

(73) Assignee: Rambus Inc., Sunnyvale, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/916,389

(22) Filed: Oct. 29, 2010

(65) Prior Publication Data

US 2011/0044378 A1 Feb. 24, 2011

Related U.S. Application Data

(63) Continuation of application No. 11/491,674, filed on Jul. 24, 2006, now Pat. No. 7,826,516, which is a continuation-in-part of application No. 11/451,932, filed on Jun. 13, 2006, now Pat. No. 7,711,075.

(60) Provisional application No. 60/736,204, filed on Nov. 15, 2005.

(51) Int. Cl.
H04B 1/10 (2006.01)
H04L 1/02 (2006.01)

(52) U.S. Cl. ......... 375/148; 375/144; 375/347; 375/349

(58) Field of Classification Search .................. 375/144, 375/147, 148, 260, 267, 346, 347, 349, 350

See application file for complete search history.

(56) References Cited

U.S. PATENT DOCUMENTS

| 5,271,042 A | 12/1993 | Borth et al. ................... 375/101 |
| 5,423,045 A | 6/1995 | Kannan et al. ................. 395/750 |
| 5,467,368 A | 11/1995 | Takeuchi ....................... 375/148 |

(Continued)

FOREIGN PATENT DOCUMENTS

EP 1179891 2/2002

(Continued)

OTHER PUBLICATIONS

Response to Notice to File Corrected Application Papers dated May 19, 2010 re U.S. Appl. No. 12/731,960. 63 Pages.

(Continued)

*Primary Examiner* — David Lugo
(74) *Attorney, Agent, or Firm* — Barcelo, Harrison & Walker LLP

(57) ABSTRACT

This invention teaches to the details of an interference canceling receiver for canceling intra-cell and inter-cell interference in coded, multiple-access, spread spectrum transmissions that propagate through frequency selective communication channels to a multiplicity of receive antennas. The receiver is designed or adapted through the repeated use of symbol-estimate weighting, subtractive cancellation with a stabilizing step-size, and mixed-decision symbol estimates. Receiver embodiments may be designed, adapted, and implemented explicitly in software or programmed hardware, or implicitly in standard RAKE-based hardware either within the RAKE (i.e., at the finger level) or outside the RAKE (i.e., at the user or subchannel symbol level). Embodiments may be employed in user equipment on the forward link or in a base station on the reverse link. It may be adapted to general signal processing applications where a signal is to be extracted from interference.

39 Claims, 16 Drawing Sheets

U.S. PATENT DOCUMENTS

| | | | | |
|---|---|---|---|---|
| 5,553,062 | A | 9/1996 | Schilling et al. | 370/18 |
| 5,568,411 | A | 10/1996 | Batruni | 364/724.19 |
| 5,606,560 | A | 2/1997 | Malek et al. | 370/347 |
| 5,644,592 | A | 7/1997 | Divsalar et al. | 375/206 |
| 5,761,237 | A | 6/1998 | Petersen et al. | 375/200 |
| 6,157,685 | A | 12/2000 | Tanaka | 375/148 |
| 6,161,209 | A | 12/2000 | Moher | 714/780 |
| 6,175,588 | B1 | 1/2001 | Visotsky et al. | 375/148 |
| 6,192,067 | B1 | 2/2001 | Toda et al. | 375/144 |
| 6,208,683 | B1 | 3/2001 | Mizuguchi et al. | 375/140 |
| 6,307,901 | B1 | 10/2001 | Yu et al. | 375/341 |
| 6,320,919 | B1 | 11/2001 | Khayrallah et al. | 375/347 |
| 6,404,760 | B1 | 6/2002 | Holtzman et al. | 370/342 |
| 6,414,949 | B1 | 7/2002 | Boulanger et al. | 370/335 |
| 6,426,973 | B1 | 7/2002 | Madhow et al. | 375/231 |
| 6,466,611 | B1 | 10/2002 | Bachu et al. | 375/144 |
| 6,496,534 | B1 | 12/2002 | Shimizu et al. | 375/148 |
| 6,522,683 | B1 | 2/2003 | Smee et al. | 375/144 |
| 6,529,495 | B1 | 3/2003 | Aazhang et al. | 375/342 |
| 6,535,554 | B1 | 3/2003 | Webster et al. | 375/233 |
| 6,546,043 | B1 | 4/2003 | Kong | 375/148 |
| 6,570,919 | B1 | 5/2003 | Lee | 375/233 |
| 6,594,318 | B1 | 7/2003 | Sindhushayana | 375/262 |
| 6,594,618 | B1 | 7/2003 | Azencott | 702/182 |
| 6,647,078 | B1 | 11/2003 | Thomas et al. | 375/349 |
| 6,678,508 | B1 | 1/2004 | Koilpillai et al. | 455/132 |
| 6,687,723 | B1 | 2/2004 | Ding | 708/322 |
| 6,690,723 | B1 | 2/2004 | Gosse et al. | 375/233 |
| 6,711,219 | B2 | 3/2004 | Thomas | 375/346 |
| 6,714,585 | B1 | 3/2004 | Wang et al. | 375/148 |
| 6,724,809 | B2 | 4/2004 | Reznik | 375/148 |
| 6,741,634 | B1 | 5/2004 | Kim et al. | 375/144 |
| 6,754,340 | B1 | 6/2004 | Ding | 379/406.08 |
| 6,816,541 | B1 | 11/2004 | Schmidl | 375/148 |
| 6,839,390 | B2 | 1/2005 | Mills | 375/341 |
| 6,850,772 | B2 | 2/2005 | Mottier | 455/526 |
| 6,909,742 | B1 | 6/2005 | Leonosky | 375/232 |
| 6,912,250 | B1 | 6/2005 | Adireddy et al. | 375/232 |
| 6,931,052 | B2 | 8/2005 | Fuller et al. | 375/144 |
| 6,947,481 | B1 | 9/2005 | Citta et al. | 375/232 |
| 6,947,506 | B2 | 9/2005 | Mills | 375/346 |
| 6,956,893 | B2 | 10/2005 | Frank et al. | 375/147 |
| 6,959,065 | B2 | 10/2005 | Sparrman et al. | 376/349 |
| 6,963,546 | B2 | 11/2005 | Misra et al. | 370/294 |
| 6,975,669 | B2 | 12/2005 | Ling et al. | 375/141 |
| 6,975,671 | B2 | 12/2005 | Sindhushayana et al. | 375/144 |
| 6,986,096 | B2 | 1/2006 | Chaudhuri et al. | 714/780 |
| 6,993,070 | B1 | 1/2006 | Berthet et al. | 675/232 |
| 6,996,385 | B2 | 2/2006 | Messier et al. | 455/226.3 |
| 7,020,175 | B2 | 3/2006 | Frank | 375/130 |
| 7,035,316 | B2 | 4/2006 | Smee et al. | 375/147 |
| 7,035,354 | B2 | 4/2006 | Karnin et al. | 375/341 |
| 7,039,095 | B2 | 5/2006 | Takahashi | 375/148 |
| 7,042,929 | B2 | 5/2006 | Pan et al. | 375/148 |
| 7,051,268 | B1 | 5/2006 | Sindhushayana et al. | 714/786 |
| 7,054,354 | B2 | 5/2006 | Gorokhov et al. | 375/148 |
| 7,069,050 | B2 | 6/2006 | Yoshida | 455/561.2 |
| 7,072,628 | B2 | 7/2006 | Agashe et al. | 455/140 |
| 7,092,464 | B2 | 8/2006 | Mills | 375/148 |
| 7,133,435 | B2 | 11/2006 | Papasakellariou et al. | 375/148 |
| 7,209,511 | B2 | 4/2007 | Dent | 375/148 |
| 7,298,805 | B2 | 11/2007 | Walton et al. | 375/347 |
| 7,397,843 | B2 | 7/2008 | Grant et al. | 375/148 |
| 7,535,969 | B2 | 5/2009 | Catreux et al. | 375/267 |
| 7,623,602 | B2 | 11/2009 | Guess et al. | 375/347 |
| 7,711,075 | B2 | 5/2010 | Guess | 375/346 |
| 7,733,941 | B2 | 6/2010 | McCloud | 375/148 |
| 7,826,516 | B2* | 11/2010 | Guess et al. | 375/148 |
| 2001/0017883 | A1 | 8/2001 | Tirola et al. | 375/148 |
| 2001/0053143 | A1 | 12/2001 | Li et al. | 370/344 |
| 2002/0009156 | A1 | 1/2002 | Hottinen et al. | 375/267 |
| 2002/0060999 | A1 | 5/2002 | Ma et al. | 370/335 |
| 2002/0118781 | A1 | 8/2002 | Thomas et al. | 375/347 |
| 2002/0131534 | A1 | 9/2002 | Ariyoshi et al. | 375/346 |
| 2002/0154717 | A1 | 10/2002 | Shima et al. | 375/349 |
| 2002/0159507 | A1 | 10/2002 | Flaig et al. | 375/148 |
| 2003/0005009 | A1 | 1/2003 | Usman | 708/322 |
| 2003/0012264 | A1 | 1/2003 | Papasakellariou et al. | 375/148 |
| 2003/0035469 | A1 | 2/2003 | Frank et al. | 375/150 |
| 2003/0086479 | A1 | 5/2003 | Naguib | 375/144 |
| 2003/0095590 | A1 | 5/2003 | Fuller et al. | 375/148 |
| 2003/0156630 | A1 | 8/2003 | Sriram et al. | 375/148 |
| 2003/0210667 | A1 | 11/2003 | Zhengdi | 370/335 |
| 2003/0219085 | A1 | 11/2003 | Endres et al. | 375/350 |
| 2004/0001537 | A1 | 1/2004 | Zhang et al. | 375/229 |
| 2004/0008765 | A1 | 1/2004 | Chung et al. | 375/233 |
| 2004/0013190 | A1 | 1/2004 | Jayaraman et al. | 375/233 |
| 2004/0076224 | A1 | 4/2004 | Onggosanusi et al. | 375/144 |
| 2004/0095907 | A1 | 5/2004 | Agee et al. | 340/334 |
| 2004/0116078 | A1 | 6/2004 | Rooyen et al. | 455/101 |
| 2004/0146024 | A1 | 7/2004 | Li et al. | 370/334 |
| 2004/0161065 | A1 | 8/2004 | Buckley et al. | 375/350 |
| 2004/0165675 | A1 | 8/2004 | Ito et al. | 375/267 |
| 2004/0190601 | A1 | 9/2004 | Papadimitriou et al. | 375/148 |
| 2004/0196892 | A1 | 10/2004 | Reznik | 375/148 |
| 2004/0248515 | A1 | 12/2004 | Molev Shteiman | 455/63.1 |
| 2004/0264552 | A1 | 12/2004 | Smee et al. | 375/147 |
| 2005/0002445 | A1 | 1/2005 | Dunyak et al. | 375/148 |
| 2005/0013349 | A1 | 1/2005 | Chae et al. | 375/148 |
| 2005/0084045 | A1 | 4/2005 | Stewart et al. | 375/350 |
| 2005/0101259 | A1 | 5/2005 | Tong et al. | 455/69 |
| 2005/0111408 | A1 | 5/2005 | Skillermark et al. | 370/331 |
| 2005/0129107 | A1 | 6/2005 | Park et al. | 375/233 |
| 2005/0152267 | A1 | 7/2005 | Song et al. | 370/210 |
| 2005/0157811 | A1 | 7/2005 | Bjerke et al. | 375/267 |
| 2005/0163196 | A1 | 7/2005 | Currivan et al. | 375/144 |
| 2005/0180364 | A1 | 8/2005 | Nagarajan | 370/335 |
| 2005/0185729 | A1 | 8/2005 | Mills | 341/50 |
| 2005/0190868 | A1 | 9/2005 | Khandekar et al. | 375/346 |
| 2005/0195889 | A1 | 9/2005 | Grant et al. | 375/148 |
| 2005/0213529 | A1 | 9/2005 | Chow et al. | 370/320 |
| 2005/0223049 | A1 | 10/2005 | Regis | 708/300 |
| 2005/0243908 | A1 | 11/2005 | Heo et al. | 375/233 |
| 2005/0259770 | A1 | 11/2005 | Chen | 348/346 |
| 2005/0265465 | A1 | 12/2005 | Hosur et al. | 375/260 |
| 2006/0007895 | A1 | 1/2006 | Coralli et al. | 370/335 |
| 2006/0013289 | A1 | 1/2006 | Hwang | 375/148 |
| 2006/0047842 | A1 | 3/2006 | McElwain | 709/231 |
| 2006/0078042 | A1 | 4/2006 | Lee et al. | 375/148 |
| 2006/0125689 | A1 | 6/2006 | Narayan et al. | 342/381 |
| 2006/0126703 | A1 | 6/2006 | Karna | 375/147 |
| 2006/0141933 | A1 | 6/2006 | Smee et al. | 455/63.1 |
| 2006/0141934 | A1 | 6/2006 | Pfister et al. | 455/63.1 |
| 2006/0141935 | A1 | 6/2006 | Hou et al. | 455/63.1 |
| 2006/0142041 | A1 | 6/2006 | Tomasin et al. | 455/522 |
| 2006/0153283 | A1 | 7/2006 | Scharf | 375/148 |
| 2006/0215781 | A1 | 9/2006 | Lee et al. | 375/267 |
| 2006/0227909 | A1* | 10/2006 | Thomas et al. | 375/346 |
| 2006/0229051 | A1 | 10/2006 | Narayan | 455/296 |
| 2006/0245509 | A1 | 11/2006 | Khan et al. | 375/260 |
| 2007/0153935 | A1 | 7/2007 | Yang et al. | 375/267 |

FOREIGN PATENT DOCUMENTS

| | | |
|---|---|---|
| WO | WO 0189107 | 11/2001 |
| WO | WO 02080432 | 10/2002 |

OTHER PUBLICATIONS

Non Final rejection dated Dec. 15, 2009 for U.S. Appl. No. 11/491,674, filed Jul. 24, 2006.

Response to Non-Final Office Action dated May 13, 2010 re U.S. Appl. No. 11/491,674 with Information Disclosure Statement includes references and Terminal Disclaimer. 109 Pages.

Wang, Xiaodong et al., "Space-Time Multiuser Detection in Multipath CDMA Channels", IEEE Transactions on Signal Processing, vol. 47, No. 9, Sep. 1999, pp. 2356-2374. 19 Pages.

Marinkovic, Slavica et al., "Space-Time Iterative and Multistage Receiver Structures for CDMA Mobile Communications Systems", IEEE Journal on Selected Areas in Communications, vol. 19, No. 8, Aug. 2001 pp. 1594-1604.11 Pages.

Jayaweera, Sudharman K. et al., "A RAKE-Based Iterative Receiver for Space-Time Block-Coded Multipath CDMA", IEEE Transactions on Signal Processing, vol. 52, No. 3, Mar. 2004 pp. 796-806. 11 Pages.

Mohamed, Nermin A. et al., "A Low-Complexity Combined Antenna Array and Interference Cancellation DS-CDMA Receiver in Multipath Fading Channels", IEEE Journal on Selected Areas in Communications, vol. 20, No. 2, Feb. 2002. pp. 248-256. 9 Pages.
Information Disclosure Statement re U.S. Appl. No. 11/491,674 submitted May 13, 2010. 2 Pages.
Response submitted May 12, 2010 to Notice to File corrected Application Papers mailed Apr. 7, 2010 re U.S. Appl. No. 12/731,915. 99 Pages.
Guo, Dongning, Rasmussen, Lars K., and Lim, Teng Joon, "Linear Parallel Interference Cancellation in Long-Code CDMA," IEEE Journal on Selected Areas in Communications, Dec. 1999, pp. 2074-2081, vol. 17, No. 12. 8 pages.
Guo, Dongning, Rasmussen, Lars K., Sun, Sumei, Lim, Teng J., and Cheah, Christopher, "MMSE-Based Linear Parallel Interference Cancellation in CDMA," IEEE Proceedings, Spread Spectrum Techniques and Appl. 0-7803-4281-X/97, Sep. 1998, pp. 917-921. 5 pages.
Rasmussen, Lars K. and Oppermann, Ian J., "Convergence Behaviour of Linear Parallel Cancellation in CDMA," IEEE Global Telecom. Conf. (San Antonio, Texas), Dec. 2001, pp. 3148-3152. 5 pages.
Guo, Dongning, Rasmussen, Lars K., Sun, Sumei, and Lim, Teng J., "A Matrix-Algebraic Approach to Linear Parallel Interference Cancellation in CDMA," IEEE Transactions on Communications, Jan. 2000, pp. 152-161, vol. 48, No. 1, 10 pages.
Rasmussen, Lars K. and Oppermann, Ian J., "Ping-Pong Effects in Linear Parallel Interference Cancellation for CDMA," IEEE Transactions on Wireless Communications, Mar. 2003, pp. 357-363, vol. 2, No. 2. 7 pages.
Lin, Tao and Rasmussen, Lars K., "Iterative Multiuser Decoding with Maximal Ratio Combining," Australian Workshop on Communication Theory, (Newcastle, Australia), Feb. 2004, pp. 42-46. 6 pages.
Lin, Tao and Rasmussen, Lars K., "Truncated Maximal Ratio Combining for Iterative Multiuser Decoding," Australian Workshop on Communication Theory, (Brisbane, Australia), Feb. 2005. 6 pages.
Wang, Xiaodong and Poor, H. Vincent, "Iterative (Turbo) Soft Interference Cancellation and Decoding for Coded CDMA," IEEE Transactions on Communications, Jul. 1999, pp. 1046-1061, vol. 47, No. 7. 16 pages.
Divsalar, Dariush, Simon, Marvin K., and Raphaeli, Dan, "Improved Parallel Interference Cancellation for CDMA," IEEE Transactions on Communications, Feb. 1998, pp. 258-268, vol. 46., No. 2. 11 pages.
Ali-Hackl, Markus, Freisleben, Stefan, Heddergott, Ralf, and Xu, Wen, "Error Vector Magnitude as a Figure of Merit for CDMA Receiver Design," The 5th European Wireless Conference, Jun. 2009. 7 pages.
Nagasawa, A. et al., "A Novel Backlight System With the Unified Component", IDW/AD '2005, vol. 12th, No. vol. 2, pp. 1285-1288. 4 pages.
Xue, Guoqiang, Weng, Jianfeng, Le-Ngoc, Tho, Tahar, Sofiene, "Adaptive Multistage Parallel Interference Cancellation for CDMA over Multipath Fading Channels," IEEE Journal on Selected Areas in Communications, Oct. 1999, vol. 17, No. 10. 13 pages.
Hooli, Kari, Juntti, Markku, Heikkila, Markku J., Komulainen, Petri, Latva-Aho, Matti, Lilleberg, Jorma, "Chip-Level Channel Equalization in WCDMA Downlink," EURASIP Journal on Applied Signal Processing 2002:8, pp. 757-770. 14 pages.
Rasmussen, Lars K., Lim, Teng J., Johansson, Ann-Louise, "A Matrix-Algebraic Approach to Successive Interference Cancellation in CDMA," IEEE Transactions on Communications, Jan. 2000, vol. 48, No. 1, pp. 145-151. 7 pages.
Tan, Peng H. and Rasmussen, Lars H., "Linear Interference Cancellation in CDMA Based on Iterative Techniques for Linear Equation Systems," IEEE Transactions on Communications, Dec. 2000, vol. 48, No. 12, pp. 2099-2108. 10 pages.
Yener, Aylin, Yates, Roy D., and Ulukus, Sennur, "CDMA Multiuser Detection: A Nonlinear Programming Approach," IEEE Transactions on Communications, Jun. 2002, vol. 50, No. 6, pp. 1016-1024. 9 pages.
Persson, Anders, Ottosson, Tony, and Strom, Erik, "Time-Frequency Localized CDMA for Downlink Multi-Carrier Systems," IEEE 7th Int. Symp. on Spread-Spectrum Tech. & Appl., Sep. 2-5, 2002, vol. 1, pp. 118-122. 5 pages.

Ping, He, Tjhung, Tjeng Thiang, Rasmussen, Lars K., "Decision-Feedback Blind Adaptive Multiuser Detector for Synchronous CDMA System," IEEE Transactions on Vehicular Technology, Jan. 2000, vol. 49, No. 1, pp. 159-166. 8 pages.
Dai, Huaiyu and Poor, H. Vincent, "Iterative Space-Time Processing for Multiuser Detection in Multipath CDMA Channels," IEEE Transactions on Signal Processing, Sep. 2002, vol. 50, No. 6, pp. 2116-2127. 12 pages.
Guo, Yuanbin, "Advanced MIMO-CDMA Receiver for Interference Suppression: Algorithms, System-on-Chip Architectures and Design Methodology," PhD Theisis, Rice University, May 2005, pp. 165-186. 27 pages.
Naidu, Prabhakar S., "Modern Digital Signal Processing: An Introduction," Alpha Science International Ltd., UK, Copyright 2003, pp. 124-126. 6 pages.
Response dated Jan. 5, 2010 re Notice of Non-Compliant Amendment re U.S. Appl. No. 11/451,685. 2 Pages.
Non Final Rejection dated Jun. 4, 2009 for U.S. Appl. No. 11/451,685, filed Jun. 13, 2006.
Amendment and Response to Office Action with mail date of Jun. 4, 2009 re U.S. Appl. No. 11/451,685, submitted on Nov. 29, 2009. 17 pages.
Response with mail date of Jun. 4, 2009, re U.S. Appl. No. 11/451,685, includes Notice of References Cited and Information Disclosure Statement, 36 pages.
PCT Notification of Transmittal of International Search Report and Written Opinion of International Searching Authority date of mailing Sep. 21, 2007, re Int'l Application No. PCT/US 06/36018. 10 pages.
Non Final Rejection dated Mar. 23, 2009 for U.S. Appl. No. 11/451,688, filed Jun. 13, 2006.
Non-Final Office Action with mail date of Mar. 23, 2009 for U.S. Appl. No. 11/451,688 includes Notice of References Cited and Information Disclosure Statement. 15 pages.
Non Final Rejection dated Apr. 3, 2009 for U.S. Appl. No. 11/451,932, filed Jun. 13, 2006.
Non-Final Office Action with mail date of Apr. 3, 2009 for U.S. Appl. No. 11/451,932 includes Notice of References and Information Disclosure Statement. 15 pages.
International Search Report, dated Apr. 26, 2007, in PCT Application No. U506/42036. 2 pages.
Nambiar, Rajiv and Goldsmith, Andrea, "Iterative Weighted Interference Cancellation for CDMA Systems with RAKE Reception," Feb. 1999 IEEE 49th, vol. 2, pp. 1232-1236. 5 pages.
Bejide, Emmanuel O. and Takawira, F., "An Iterative Multiuser Detector for DS-CDMA Systems in Multipath Fading Channels," IEEE Communications Society, Mar. 2004, pp. 54-59. 6 pages.
Notification of Transmittal of International Search Report and Written Opinion of the International Searching Authority with mail date of Apr. 26, 2007 re PCT/US2006/042036 filed on Oct. 30, 2006, with documents citations. 3 pages.
Information Disclosure Statement submitted Sep. 11, 2006 for Control U.S. Appl. No. 11/452,027, filed Jun. 13, 2006. 9 Pages.
Proakis, John G., "Digital Communications," McGraw-Hill, 4th edition, 2000, pp. 622-626, 956-959. 10 pages.
Verdu, Sergio, "Multiuser Detection," Cambridge University Press, New York, NY, 1998, pp. 291-306. 18 pages.
Kim, Seong Rag, Choi, In-Kyeong, Kang, Sugbong, Lee, Jeong Goo, "Adaptive Weighted Parallel Interference Cancellation for CDMA Systems," Electronic Letters, Oct. 29, 1998, V34, No. 22. 2 pages.
Response to Office Action Summary mail date Jun. 11, 2009, re U.S. Appl. No. 11/479,401 (Includes Notice of References Cited and Information Disclosure Statement). 9 pages.
Information Disclosure Statement submitted Nov. 21, 2007 for Control U.S. Appl. No. 11/475,458, filed Aug. 28, 2006, 3 pages.
Response to Office Action Summary, mail date Aug. 17, 2009, re U.S. Appl. No. 11/475,458 (Includes Notice of References Cited). 14 pages.
Sayed, Ali H., "Fundamentals of Adaptive Filtering," John Wiley & Sons, Inc. Hoboken, NJ, Jun. 2003, pp. 170-171, 174, 187. 7 pages.
Office Action with mail date of Sep. 28, 2010, re U.S. Appl. No. 12/731,960, includes Notice of References Cited. 7 pages.
Office Action with mail date of Aug. 30, 2010, re U.S. Appl. No. 12/731,779, includes Notice of References Cited. 5 pages.

Office Action with mail date of Aug. 30, 2010, re U.S. Appl. No. 12/769,510. 4 pages.
Notice of Allowance and Fee(s) due with mail date Nov. 5, 2010, re U.S. Appl. No. 11/451,685. 11 Pages.
PCT Preliminary Report on Patentability dated Mar. 26, 2008 for PCT/US2006/36018 filed on Sep. 15, 2006.
PCT Preliminary Report on Patentability dated May 20, 2008 for PCT/US2006/42036 filed on Oct. 30, 2006.
Non Final Office Action dated Jun. 11, 2009 re U.S. Appl. No. 11/479,401, filed Jun. 29, 2006. 6 Pages.
Non Final Office Action dated Aug. 17, 2009 re U.S. Appl. No. 11/475,458, filed Aug. 28, 2006. 13 Pages.
Appeal Brief submitted Feb. 23, 2010 by Appellant(s) on Jan. 27, 2010 re U.S. Appl. No. 10/993,046. 47 Pages.
Notice of Allowance and Fee(s) Due with mail date of Mar. 21, 2011 re U.S. Appl. No. 11/451,686 includes Information Disclosure Statement. 15 Pages.
Preliminary Amendment dated Mar. 30, 2011 re U.S. Appl. No. 12/731,915. 23 Pages.
Office Action dated Jun. 28, 2011 for U.S. Appl. No. 11/451,685 re signed and dated Form 1449. 2 Pages.

* cited by examiner

ITERATIVE INTERFERENCE CANCELER FOR WIRELESS MULTIPLE-ACCESS SYSTEMS WITH MULTIPLE RECEIVE ANTENNAS

CROSS-REFERENCE TO RELATED APPLICATIONS

This application claims priority to U.S. patent application Ser. No. 11/491,674, entitled "An Iterative Interference Canceller for Wireless Multiple-Access Systems with Multiple Receive Antennas," filed Jul. 24, 2006, and published as U.S. Patent Application Publication Number 2007-0110136 A1; which claims priority to (1) U.S. Patent Application Ser. No. 60/736,204, filed Nov. 15, 2005, and entitled "Iterative Interference Cancellation Using Mixed Feedback Weights and Stabilizing Step Sizes,"; (2) and is a Continuation in Part of U.S. patent application Ser. No. 11/451,932, filed Jun. 13, 2006, and entitled "Iterative Interference Cancellation Using Mixed Feedback Weights and Stabilizing Step Sizes," now U.S. Pat. No. 7,711,075. The entirety of each of the foregoing patents, patent applications, and patent application publications is incorporated by reference herein.

BACKGROUND

1. Field of the Invention

The present invention relates generally to cancellation of intra-channel and inter-channel interference in coded spread spectrum wireless communication systems with multiple receive antennas. More specifically, the invention takes advantage of the receive diversity afforded by multiple receive antennas in combination with multiple uses of an interference-cancellation unit consisting of symbol-estimate weighting, subtractive cancellation with a stabilizing step-size, and a mixed-decision symbol estimator.

2. Discussion of the Related Art

In an exemplary wireless multiple-access system, a communication resource is divided into code-space subchannels allocated to different users. A plurality of subchannel signals received by a wireless terminal (e.g., a subscriber unit or a base station) may correspond to different users and/or different subchannels allocated to a particular user.

If a single transmitter broadcasts different messages to different receivers, such as a base station in a wireless communication system serving a plurality of mobile terminals, the channel resource is subdivided in order to distinguish between messages intended for each mobile. Thus, each mobile terminal, by knowing its allocated subchannel(s), may decode messages intended for it from the superposition of received signals. Similarly, a base station typically separates signals it receives into subchannels in order to differentiate between users.

In a multipath environment, received signals are superpositions of time-delayed and complex-scaled versions of the transmitted signals. Multipath can cause several types of interference. Intra-channel interference occurs when the multipath time-spreading causes subchannels to leak into other subchannels. For example, forward-link subchannels that are orthogonal at the transmitter may not be orthogonal at the receiver. When multiple base stations (or sectors or cells) are active, inter-channel interference may result from unwanted signals received from other base stations. These types of interference can degrade communications by causing a receiver to incorrectly decode received transmissions, thus increasing a receiver's error floor. Interference may degrade communications in other ways. For example, interference may diminish the capacity of a communication system, decrease the region of coverage, and/or decrease maximum data rates. For these reasons, a reduction in interference can improve reception of selected signals while addressing the aforementioned limitations due to interference. Multiple receive antennas enable the receiver to process more information, allowing greater interference-reduction than can be accomplished with a single receive antenna.

In code division multiple access (such as used in CDMA 2000, WCDMA, EV-DO (in conjunction with time-division multiple access), and related standards), a set of symbols is sent across a common time-frequency slot of the physical channel and separated by the use of a set of distinct code waveforms, which are usually chosen to be orthogonal (or pseudo-orthogonal for reverse-link transmissions). The code waveforms typically vary in time, with variations introduced by a pseudo-random spreading code (PN sequence). The wireless transmission medium is characterized by a time-varying multipath profile that causes multiple time-delayed replicas of the transmitted waveform to be received, each replica having a distinct amplitude and phase due to path loss, absorption, and other propagation effects. As a result, the received code set is no longer orthogonal. Rather, it suffers from intra-channel interference within a base station and inter-channel interference arising from transmissions in adjacent cells.

SUMMARY OF THE INVENTION

In view of the foregoing background, embodiments of the present invention may provide a generalized interference-canceling receiver for canceling intra-channel and inter-channel interference in multiple-access coded-waveform transmissions that propagate through frequency-selective communication channels and are received by a plurality of receive antennas. Receiver embodiments may be designed, adapted, and implemented explicitly in software or programmed hardware, or implicitly in standard RAKE-based hardware. Embodiments may be employed in user equipment on the downlink or in a base station on the uplink.

An interference-cancellation system configured for canceling at least one of inter-cell and intra-cell interference in multiple-access communication signals received from a plurality of antennas comprises a front-end processing means coupled to an iterative interference-cancellation means.

A front-end processing means is configured for generating initial symbol estimates to be coupled to an iterative interference-cancellation means. The front-end processing means may include, by way of example, but without limitation, a combiner configured for combining received signals from each of a plurality of transmission sources across a plurality of antennas for producing combined signals, a despreader configured for resolving the combined signals onto a signal basis for the plurality of transmission sources to produce soft symbol estimates from the plurality of transmission sources, and a symbol estimator configured for performing a mixed decision on each of the soft symbol estimates to generate the initial symbol estimates.

In one embodiment, the front-end processing means may further comprise a synthesizer configured for synthesizing estimated Rake finger signals for each antenna that would be received if weighted symbol decisions were employed at the plurality of transmission sources, and a subtraction module configured for performing per-antenna subtraction of a sum of synthesized Rake finger signals from that antenna's received signal to produce an error signal.

In another embodiment, the front-end processing means may further comprise a despreader configured for resolving each of a plurality of error signals corresponding to each of a plurality of antennas onto a signal basis for the plurality of transmission sources for producing a plurality of resolved error signals, a first combiner configured for combining the resolved error signals across antennas for producing a combined signal, a stabilizing step-size module configured to scale the combined signal by a stabilizing step size for producing a scaled signal, and a second combiner configured for combining the combined signal with a weighted input vector.

An iterative interference-cancellation means may include, by way of example, but without limitation, a sequence of interference-cancellation units. In one embodiment, each interference-cancellation unit is configured for processing signals received by each of the plurality of antennas, whereby constituent signals for each of a plurality of antennas are added back to corresponding scaled error signals to produce error signals for a plurality of transmission sources, followed by resolving the error signals for the plurality of transmission sources across the plurality of antennas onto a signal basis for the plurality of transmission sources.

In one embodiment, each interference-cancellation unit may comprise a soft-weighting module configured to apply weights to a plurality of input symbol decisions to produce weighted symbol decisions, a synthesizer corresponding to each antenna of the plurality of antennas and configured for synthesizing constituent signals, a subtractive canceller configured to perform a per-antenna subtraction of the synthesized signal from the received signal to produce a plurality of per-antenna error signals, a stabilizing step size module configured for scaling the plurality of antenna error signals by a stabilizing step size for producing a plurality of scaled error signals, a combiner configured for combining each of the constituent signals with its corresponding scaled error signal to produce a plurality of interference-cancelled constituents, a resolving module configured for resolving each of the interference-cancelled constituent signals onto a signal basis for a plurality of transmit sources to produce the interference-cancelled input symbol decisions, and a mixed-decision module configured for processing the interference-cancelled symbol decisions to produce the updated symbol decisions.

Embodiments of the invention may be employed in any receiver configured to support the standard offered by the 3rd-Generation Partnership Project 2 (3GPP2) consortium and embodied in a set of documents, including "TR-45.5 Physical Layer Standard for cdma2000 Spread Spectrum Systems," "C.S0005—A Upper Layer (Layer 3) Signaling Standard for cdma2000 Spread Spectrum Systems," and "C.S0024 CDMA2000 High Rate Packet Data Air Interface Specification" (i.e., the CDMA2000 standard).

Receivers and cancellation systems described herein may be employed in subscriber-side devices (e.g., cellular handsets, wireless modems, and consumer premises equipment) and/or server-side devices (e.g., cellular base stations, wireless access points, wireless routers, wireless relays, and repeaters). Chipsets for subscriber-side and/or server-side devices may be configured to perform at least some of the receiver and/or cancellation functionality of the embodiments described herein.

Various functional elements, separately or in combination as depicted in the figures, may take the form of a microprocessor, digital signal processor, application specific integrated circuit, field programmable gate array, or other logic circuitry programmed or otherwise configured to operate as described herein. Accordingly, embodiments may take the form of programmable features executed by a common processor or a discrete hardware unit.

These and other embodiments of the invention are described with respect to the figures and the following description of the preferred embodiments.

BRIEF DESCRIPTION OF THE DRAWINGS

Embodiments according to the present invention are understood with reference to the following figures.

Various functional elements or steps, separately or in combination, depicted in the figures may take the form of a microprocessor, digital signal processor, application specific integrated circuit, field programmable gate array, or other logic circuitry programmed or otherwise configured to operate as described herein. Accordingly, embodiments may take the form of programmable features executed by a common processor or discrete hardware unit.

DESCRIPTION OF THE PREFERRED EMBODIMENTS

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art.

The following formula represents an analog baseband signal received from multiple base stations by antenna a of a receiver, $$y_a(t) = \sum_{s=1}^{B} \sum_{l=1}^{L_{a,s}} \alpha_{a,s,l} \sum_{k=1}^{K_s} b_{s,k} u_{s,k}(t - \tau_{a,s,l}) + w_a(t),$$ Equation 1

$t \in (0, T),$ with the following definitions
- a represents an $a^{th}$ antenna of a mobile and ranges from 1 to A;
- (0, T) is a symbol interval;
- B is a number of modeled base stations, which are indexed by subscript s, which ranges from 1 to B. The term "base station" may be used herein to convey cells or sectors;
- $L_{a,s}$ is the number of resolvable (or modeled) paths from base station s to antenna a of the mobile, and is indexed from 1 to $L_{a,s}$;
- $\alpha_{a,s,l}$ and $\tau_{a,s,l}$ are, respectively, the complex gain and delay associated with an $l^{th}$ path from base station s to antenna a of the mobile;
- $K_s$ represents a number of active subchannels in base station s that employ code division multiplexing to share the channel. The subchannels are indexed from 1 to $K_s$;
- $u_{s,k}(t)$ is a code waveform (e.g., spreading waveform) used to carry a $k^{th}$ subchannel's symbol for an $s^{th}$ base station (e.g., a chip waveform modulated by a subchannel-specific Walsh code and covered with a base-station specific PN cover);
- $b_{s,k}$ is a complex symbol being transmitted for the $k^{th}$ subchannel of base station s; and
- $w_a(t)$ denotes zero-mean complex additive noise on the $a^{th}$ antenna. The term $w_a(t)$ may include thermal noise and any interference whose structure is not explicitly modeled (e.g., inter-channel interference from unmodeled base stations, and/or intra-channel interference from unmodeled paths).

Figure 1:
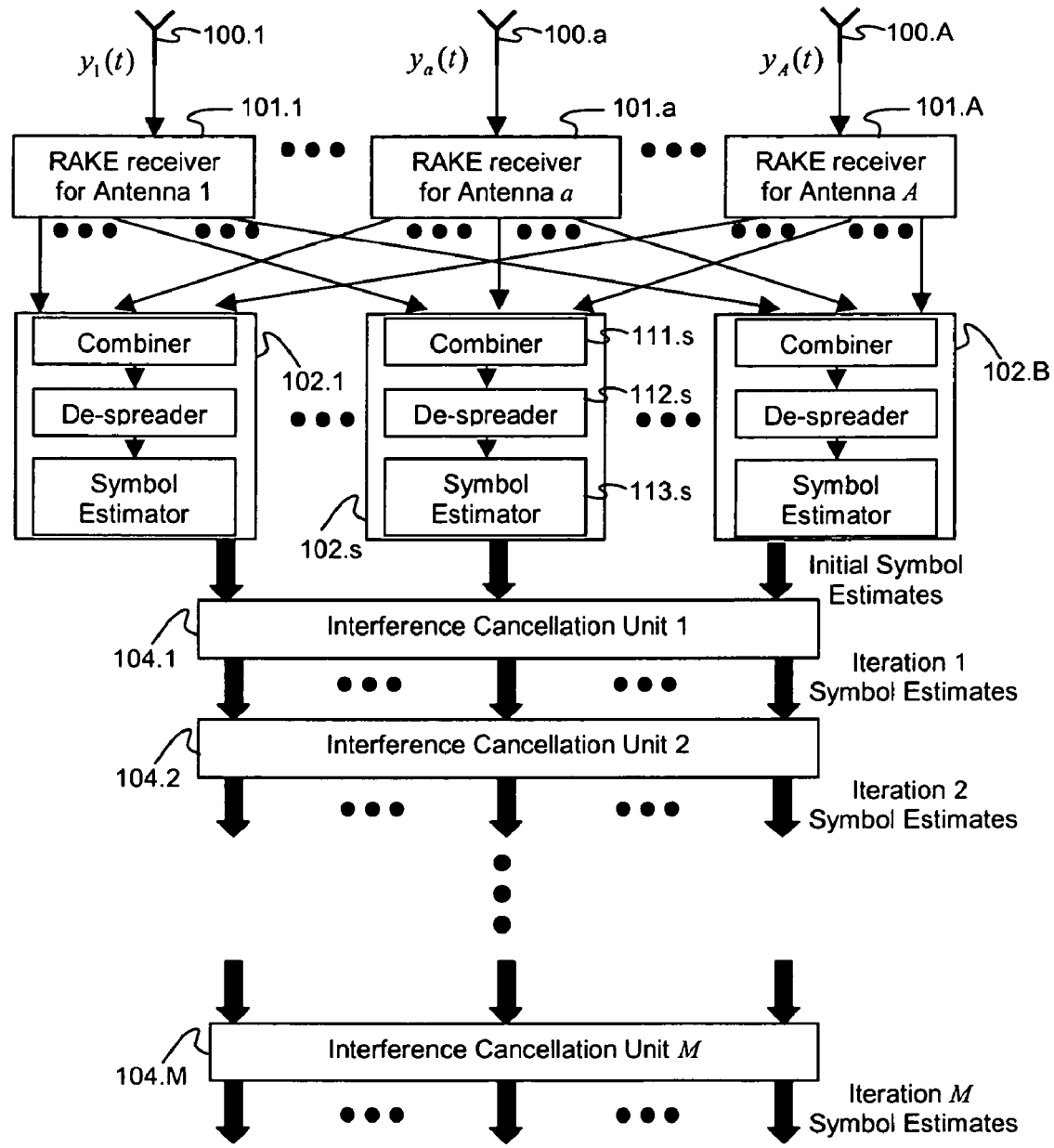
FIG. 1 is a general schematic illustrating an iterative interference canceller for multiple receive antennas.

FIG. 1 illustrates an iterative interference canceller in accordance with one embodiment of the invention. Received signals from each of a plurality of antennas 100.1-100.A are processed by corresponding RAKE receivers 101.1-101.A. Each RAKE receiver 101.1-101.A may comprise a maximal ratio combiner (not shown).

Multipath components received by each RAKE receiver 101.1-101.A are separated with respect to their originating base stations and processed by a plurality B of constituent-signal analyzers 102.1-102.B. Each constituent-signal analyzer 102.1-102.B comprises a combiner, a despreader, and a symbol estimator, such as combiner 111.s, despreader 112.s, and symbol estimator 113.s in constituent-signal analyzer 102.s.

Signals received from different antennas 100.1-100.A corresponding to an $s^{th}$ originating base station are synchronized, and then combined (e.g., maximal ratio combined) by combiner 111.s to produce an $s^{th}$ diversity-combined signal. The despreader 112.s resolves the $s^{th}$ diversity-combined signal onto subchannel code waveforms, and the symbol estimator 113.s produces initial symbol estimates, which are input to a first interference cancellation unit (ICU) 104.1 of a sequence of ICUs 104.1-104.M.

ICU 104.1 mitigates intra-channel and/or inter-channel interference in the estimates in order to produce improved symbol estimates. Successive use of ICUs 104.2-104.M further improves the symbol estimates. The ICUs 104.1-104.M may comprise distinct units, or a single unit configured to perform each iteration.

Figure 2:
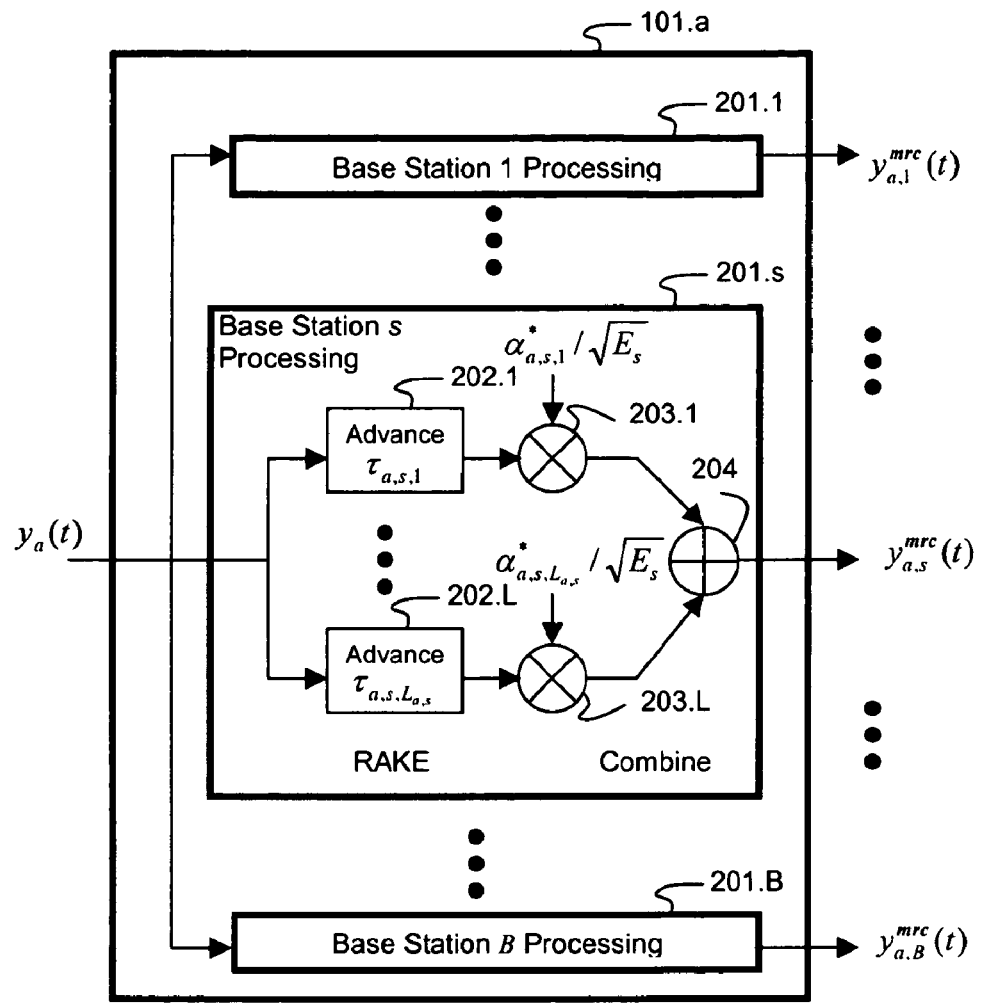
FIG. 2 is a block diagram illustrating a per-antenna front-end RAKE and combiner.

FIG. 2 is a block diagram of a Rake receiver, such as RAKE receiver 101.a. One of a plurality of processors 201.1-201.B is associated with each base station. For example, processor 201.s associated with an $s^{th}$ base station comprises a plurality L of time-advance modules 202.1-202.L configured to advance the received signal in accordance with L multipath time offsets. Weighting modules 203.1-203.L provide corresponding maximal-ratio combining weights $\alpha_{a,s,l}$ to the time-advanced signals, and a combiner 204 combines the weighted signals to produce an output for the $a^{th}$ antenna $$y_{a,s}^{mrc}(t) = \frac{1}{\sqrt{E_s}} \sum_{l=1}^{L_{a,s}} \alpha_{a,s,l}^* y_a(t - \tau_{a,s,l}),$$ Equation 2 where $E_s = \sum_{l=1}^{L_{a,s}} |\alpha_{a,s,l}|^2.$

Figure 3:
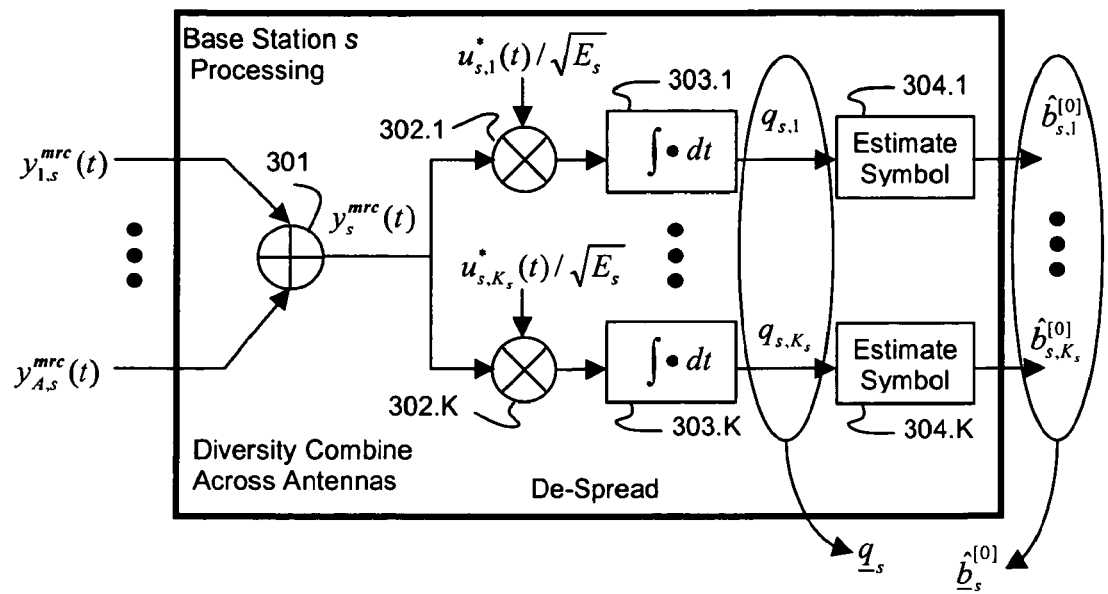
FIG. 3 is a block diagram illustrating a per base-station front-end combiner configured for combining like base-station signals across antennas, a de-spreading module, and an initial symbol decision module.

FIG. 3 is a block diagram of an exemplary constituent-signal analyzer, such as constituent-signal analyzer 102.s shown in FIG. 1. A combiner 301 for a given base station sums the signals over the plurality A of antennas to produce a combined signal for base station s over all paths and all antennas $$y_s^{mrc}(t) = \sum_{a=1}^{A} y_{a,s}^{mrc}(t).$$ Equation 3

The combined signal is resolved onto subchannel code waveforms by a plurality K of despreading modules, comprising K code-waveform multipliers 302.1-302.K and integrators 303.1-303.K, to give $$q_{s,k} \equiv \frac{1}{E_s} \int_0^T u_{s,k}^*(t) y_s^{mrc}(t) dt$$ Equation 4 as a RAKE/Combine/De-Spread output for the $k^{th}$ subchannel of base station s. A column vector of these outputs is denoted $$\underline{q}_s = [q_{s,1} \quad q_{s,2} \quad \cdots \quad q_{s,K_s}]^T$$ Equation 5 for base station s, where the superscript T denotes matrix transpose. Each $q_{s,k}$ is processed by one of a plurality of symbol estimators 304.1-304.K to produce $\hat{b}_{s,k}^{[0]}$=Estimate Symbol$\{q_{s,k}\}$, Equation 6 where the superscript [0] indicates the initial symbol estimate produced by front-end processing. Symbol estimators 304.1-304.K may include mixed-decision symbol estimators described in U.S. Patent Application Ser. No. 60/736,204, or other types of symbol estimators. An output vector of symbol estimates for base station s may be formed as $$\hat{\underline{b}}_{s,k}^{[0]} = \begin{bmatrix} \hat{b}_{s,1}^{[0]} & \hat{b}_{s,2}^{[0]} & \cdots & \hat{b}_{s,K_s}^{[0]} \end{bmatrix}^T.$$

It should be appreciated that one or more of the functions described with respect to FIG. 3 may be implemented on discrete-time sequences generated by sampling (or filtering and sampling) continuous waveforms. More specifically, time advances (or delays) of waveforms become shifts by an integer number of samples in discrete-time sequences, and integration becomes summation.

Figure 4:
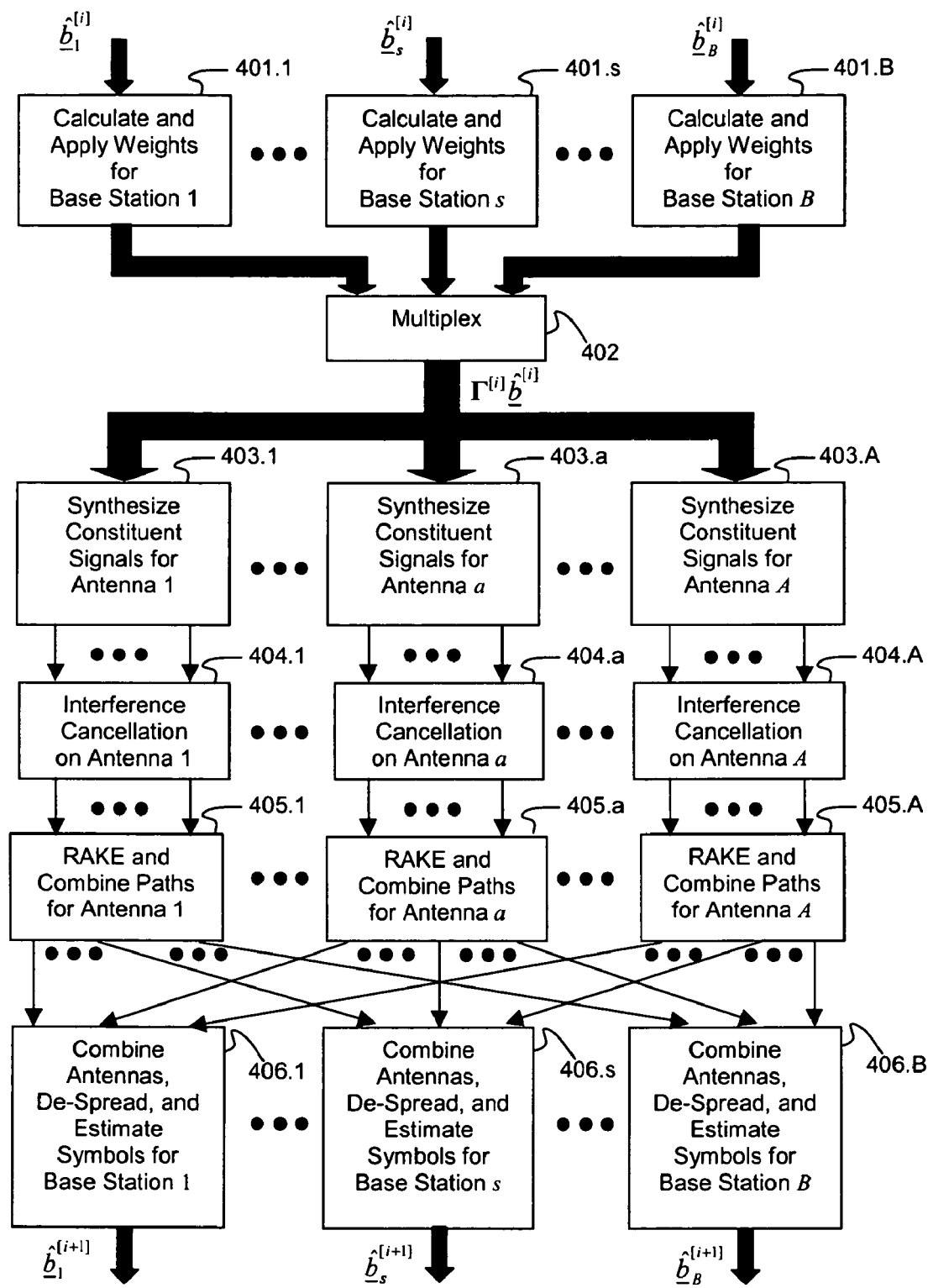
FIG. 4 is a general schematic of an ICU configured to process signals from multiple receive antennas.

FIG. 4 is a flow chart illustrating a functional embodiment of an ICU, such as one of the ICUs 104.1-104.M. Similar ICU embodiments are described in U.S. Patent Application Ser. No. 60/736,204 for a system with a single receive antenna. However, the embodiment shown in FIG. 4 conditions a plurality of received antenna signals for a parallel bank of ICUs and conditions ICU outputs prior to making symbol estimates. Symbol estimates for a plurality of sources are input to the ICU and weighted 401.1-401.B according to perceived merits of the symbol estimates. Any of the soft-weighting methods described in U.S. Patent Application Ser. No. 60/736,204 may be employed. The weighting of a $k^{th}$ sub-channel of base station s is expressed by $$\gamma_{s,k}^{[i]} \hat{b}_{s,k}^{[i]} \qquad \text{Equation 7}$$

where $\hat{b}_{s,k}^{[i]}$ is the input symbol estimate, $\gamma_{s,k}^{[i]}$ is its weighting factor, and superscript [i] represents the output of the $i^{th}$ ICU. The superscript [0] represents the output of front-end processing prior to the first ICU. The symbol estimates may be multiplexed (e.g., concatenated) 402 into a single column vector $$\hat{\underline{b}}^{[i]} = \begin{bmatrix} (\hat{\underline{b}}_1^{[i]})^T & (\hat{\underline{b}}_2^{[i]})^T & \cdots & (\hat{\underline{b}}_B^{[i]})^T \end{bmatrix}^T$$

such that the weighted symbol estimates are given by $\Gamma^{[i]}\hat{\underline{b}}^{[i]}$, where $\delta^{[i]}$ is a diagonal matrix containing the weighting factors along its main diagonal. The weighted symbol estimates are processed by a synthesizer used to synthesize 403.1-403.A constituent signals for each antenna. For each antenna, a synthesized signal represents a noise-free signal that would have been observed at antennas a with the base stations transmitting the weighted symbol estimates $\Gamma^{[i]}\hat{\underline{b}}^{[i]}$ over the multipath channels between base stations 1 through B and the mobile receiver.

For each antenna, a subtraction module performs interference cancellation 404.1-404.A on the constituent signals to reduce the amount of intra-channel and inter-channel interference. The interference-cancelled constituents are processed via per-antenna RAKE processing and combining 405.1-405.A to produce combined signals. The combined signals are organized by base station, combined across antennas, resolved onto the subchannel code waveforms, and processed by symbol estimators 406.1-406.B. The terms $\hat{b}_{s,k}^{[i+1]}$ denote the estimated symbol for the $k^{th}$ subchannel of base station s after processing by the $(i+1)^{th}$ ICU.

Figure 5A:
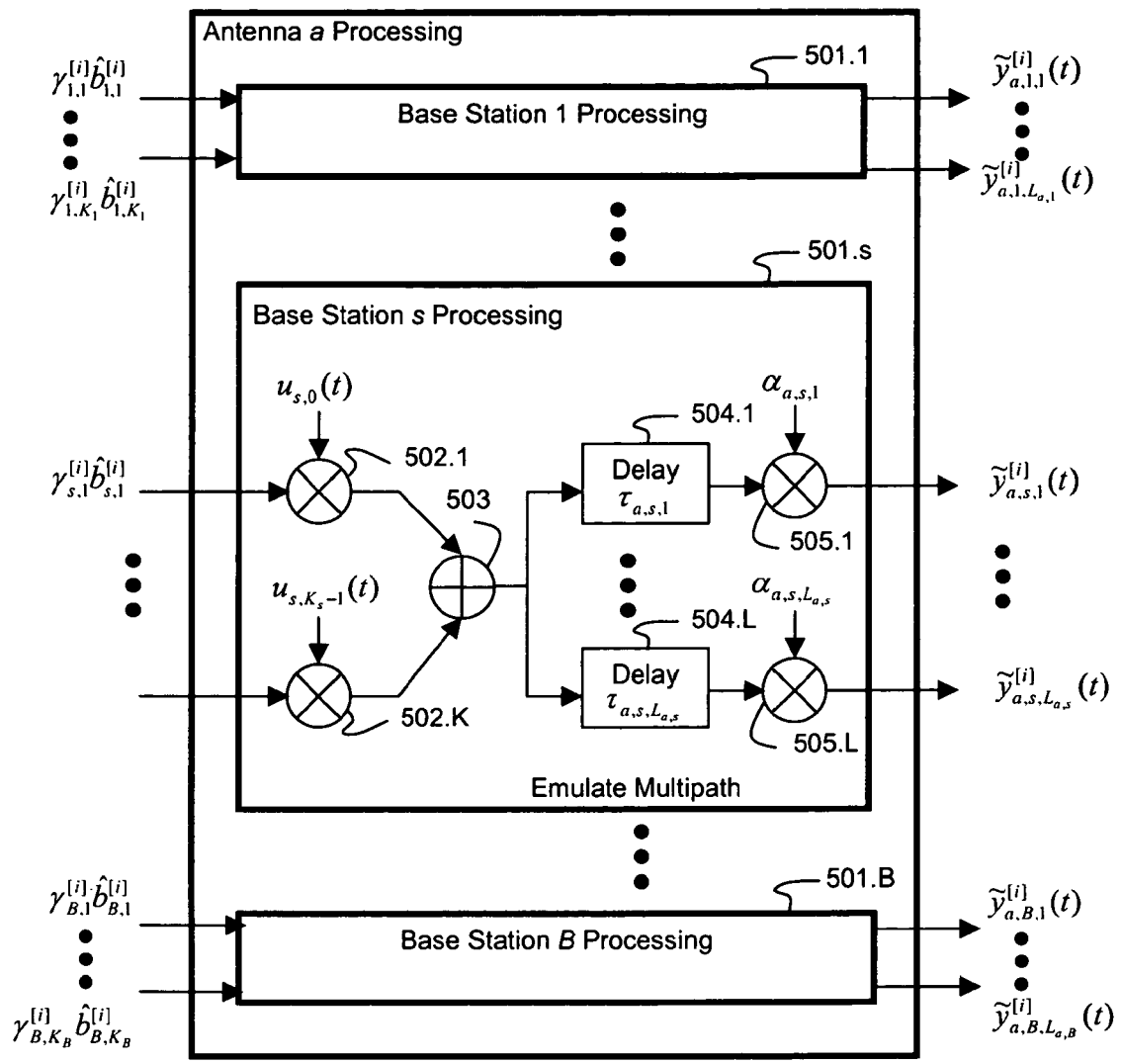
FIG. 5a is a per-antenna block diagram illustrating part of an interference-cancellation unit that synthesizes constituent finger signals.
Figure 5B:
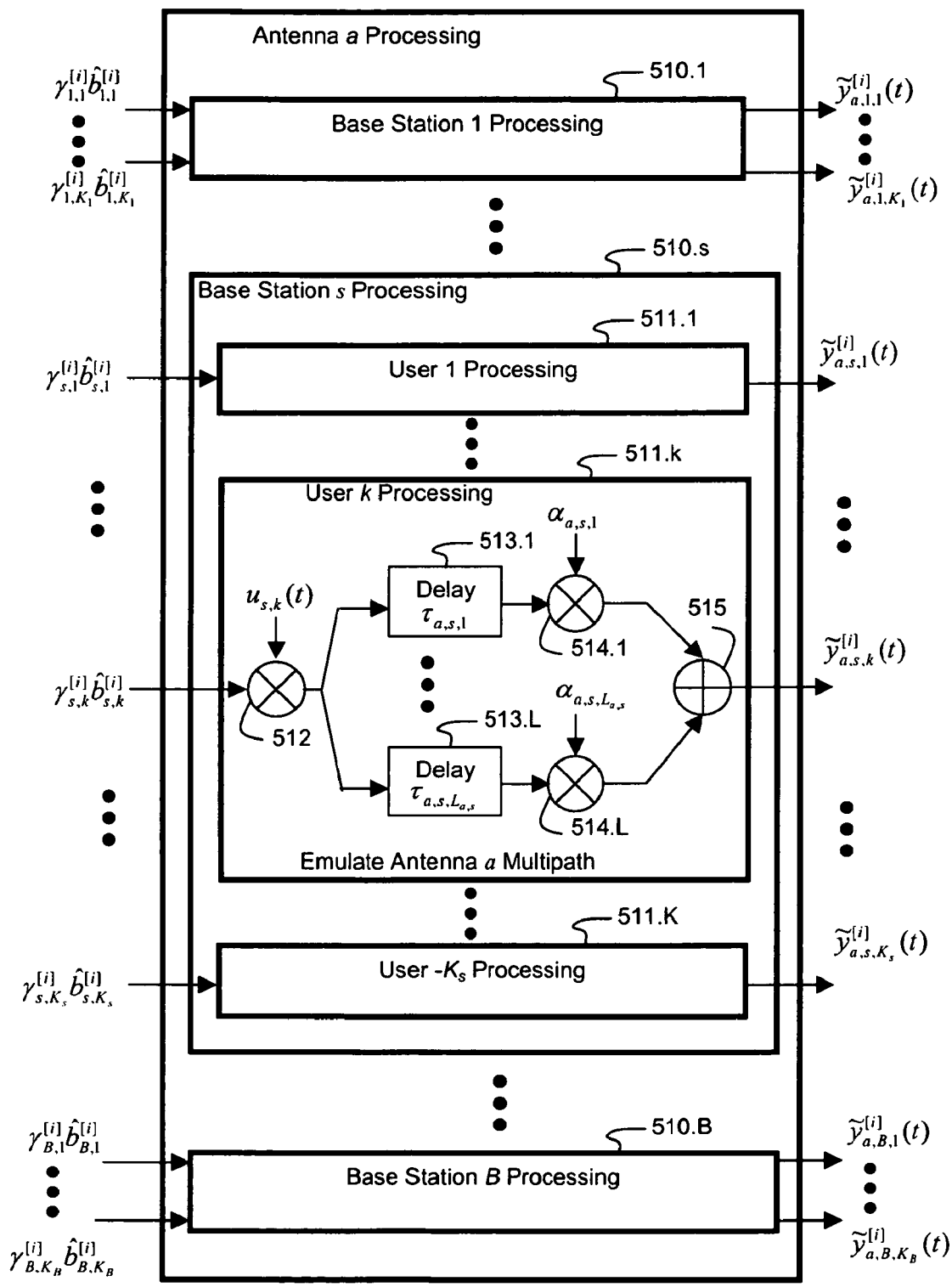
FIG. 5b is a per-antenna block diagram illustrating part of an interference-cancellation unit that synthesizes constituent subchannel signals.

FIG. 5a illustrates an apparatus configured for generating multipath finger constituent signals and FIG. 5b shows an apparatus configured for generating subchannel constituents. A plurality of processors 501.1-501.B is configured for processing signals received from each base station. For an $s^{th}$ base station, a plurality $K_s$ of multipliers 502.1-502.K scales each code waveform with a corresponding weighted symbol estimate to produce a plurality of estimated transmit signals, which are combined by combiner 503 to produce a superposition signal $$\sum_{k=0}^{K_s-1} \gamma_{s,k}^{[i]} \hat{b}_{s,k}^{[i]} u_{s,k}(t) \qquad \text{Equation 8}$$

A multipath channel emulator comprising path-delay modules 504.1-504.L and path-gain modules 505.1-505.L produces multipath finger constituent signals expressed by $$\tilde{y}_{a,s,l}^{[i]}(t) = \alpha_{a,s,l} \sum_{k=0}^{K_s-1} \gamma_{s,k}^{[i]} \hat{b}_{s,k}^{[i]} u_{s,k}(t - \tau_{a,s,l}), \qquad \text{Equation 9}$$

where $\tilde{y}_{a,s,l}^{[i]}(t)$ is the $l^{th}$ finger constituent for the channel between base station s and antenna a.

FIG. 5b shows an apparatus configured for generating sub-channel constituents. For a particular antenna a, a processor 510.1-510.B is configured for processing signals received from each base station. Within each base station processor 510.1-510.B, a plurality of processors 511.1-511.K are configured for processing each subchannel. Each subchannel processor 511.1-511.K comprises a multiplier 512 that scales a $k^{th}$ code waveform with a corresponding weighted symbol estimate to produce an estimated transmit signal, which is processed by a multipath channel emulator comprising path delay modules 513.1-513.L path-gain modules 514.1-514.L, and a combiner of the multiple paths 515 to produce $$\tilde{y}_{a,s,l}^{[i]}(t) \equiv \gamma_{s,k}^{[i]} \hat{b}_{s,k}^{[i]} \sum_{l=0}^{L_{a,s}} \alpha_{a,s,l} u_{s,k}(t - \tau_{a,s,l}), \qquad \text{Equation 10}$$

which is the synthesized constituent signal for the $k^{th}$ sub-channel of base station s at the $a^{th}$ antenna of the mobile. Note that while Equation 9 and Equation 10 both show a signal with a three-parameter subscript for their left-hand sides, they are different signals; the subscript l (as in Equation 9) will be reserved for a finger constituent and the subscript k (as in Equation 10) will be reserved for a subchannel constituent.

Figure 6:
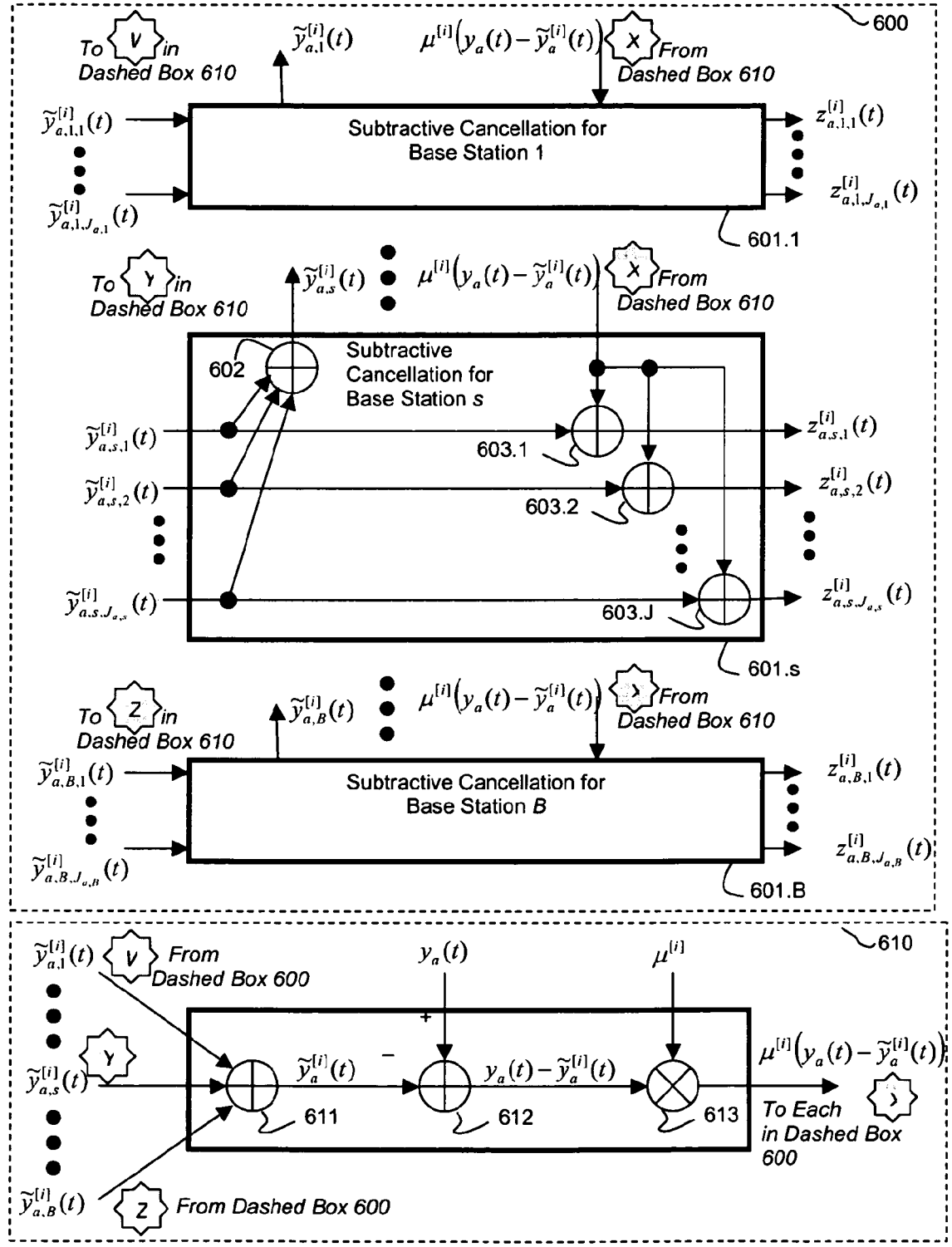
FIG. 6 is a block diagram of a subtractive canceller in which cancellation is performed prior to signal despreading.

FIG. 6 is a block diagram showing an apparatus configured for performing interference cancellation on synthesized constituent signals for each antenna. Since, the constituent signals for each antenna a may comprise multipath finger constituents or subchannel constituents. The index $j \in \{1, \ldots, J_{a,s}\}$ is introduced, where $$J_{a,s} = \begin{cases} L_{a,s} & \text{for finger constituents} \\ K_s & \text{for subchannel constituents} \end{cases}$$

A first processor 600 comprises a plurality B of subtractive cancellers 601.1-601.B configured for processing constituent signals relative to each of a plurality B of base stations. Canceller 601.s is illustrated with details that may be common to the other cancellers 601.1-601.B. A combiner 602 sums the constituent signals to produce a synthesized received signal associated with base station s, $$\tilde{y}_{a,s}^{[i]}(t) \equiv \sum_{j=0}^{J_{a,s}} \tilde{y}_{a,s,j}^{[i]},$$

where $\tilde{y}_{a,s,j}^{[i]}$ is the $j^{th}$ constituent finger or subchannel signal on the $a^{th}$ antenna for base station s.

A second processor 610 comprises a combiner 611 configured for combining the synthesized received signals across base stations to produce a combined synthesized receive signal $$\tilde{y}_a^{[i]}(t) = \sum_{s=1}^{B} \tilde{y}_{a,s}^{[i]}$$

corresponding to the $a^{th}$ antenna. A subtraction module 612 produces a signal from the difference between the combined synthesized receive signal and the actual received signal to create a residual signal $y_a(t) - \tilde{y}_a^{[i]}(t)$. A step size scaling module 613 scales the residual signal with a complex stabilizing step size $\mu_a^{[i]}$ 613 to give a scaled residual signal $\mu_a^{[i]}(y_a(t) - \tilde{y}_a^{[i]}(t))$. The scaled residual signal is returned to the cancellers 601.1-601.B in the first processor 601 where combiners, such as combiners 603.1-603.J in the canceller 601.s add the scaled residual signal to the constituent signals to produce a set of interference-cancelled constituents expressed by $$z_{a,s,j}^{[i]}(t) \equiv \tilde{y}_{a,s,l}^{[i]}(t) + \mu_a^{[i]}(y_a(t) - \tilde{y}_a^{[i]}(t)) \quad \text{Equation 11}$$

for an interference-cancelled $j^{th}$ constituent finger or subchannel signal on the $a^{th}$ antenna for base station s. The term $\mu_a^{[i]}$ may be evaluated as shown in U.S. patent application Ser. No. 11/451,932, which describes calculating a step size for a single receive antenna. In one embodiment the same step size may be employed for all antennas, meaning $\mu_a^{[i]} = \mu^{[i]}$ for all a.

Figure 7A:
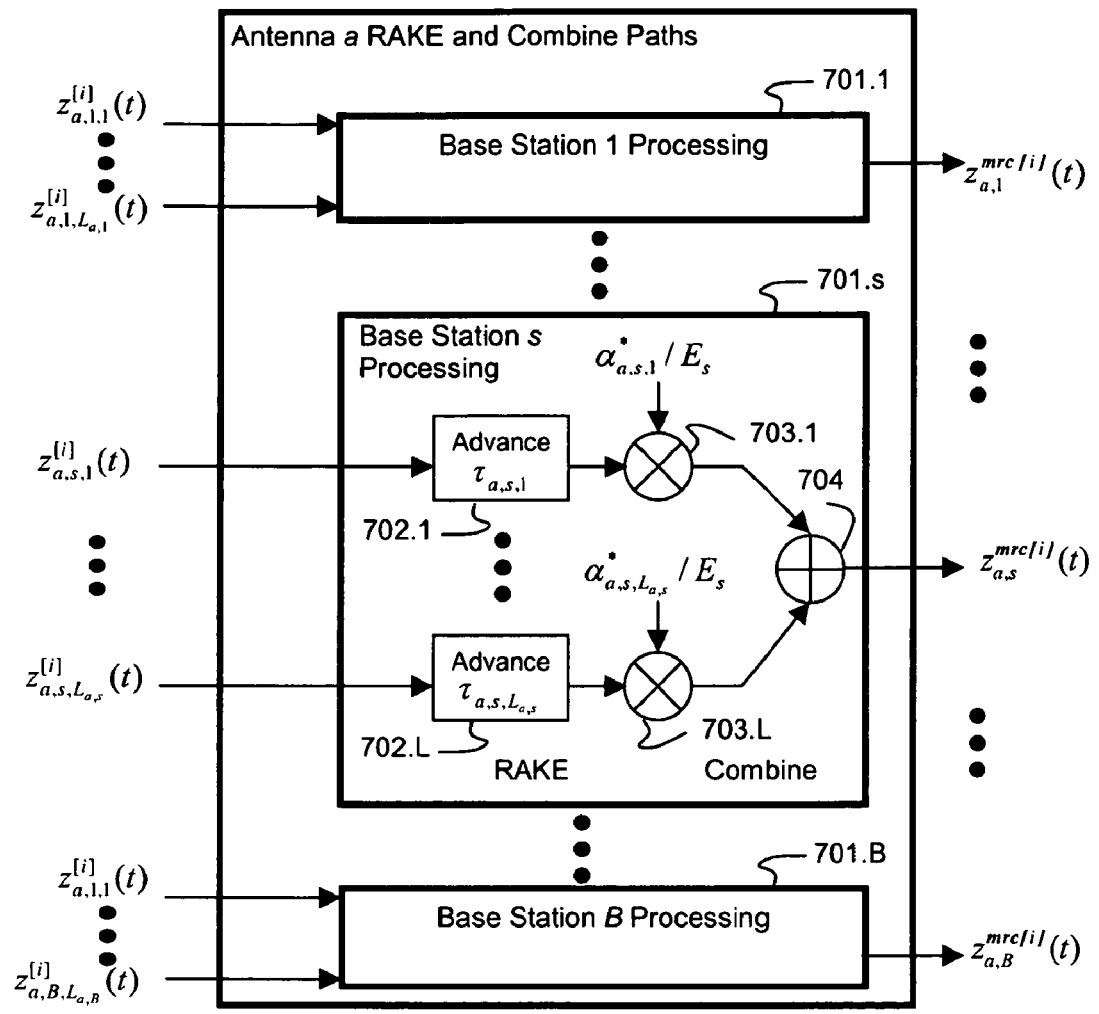
FIG. 7a is a block diagram illustrating per-antenna RAKE processing and combining on interference-cancelled finger signals.
Figure 7B:
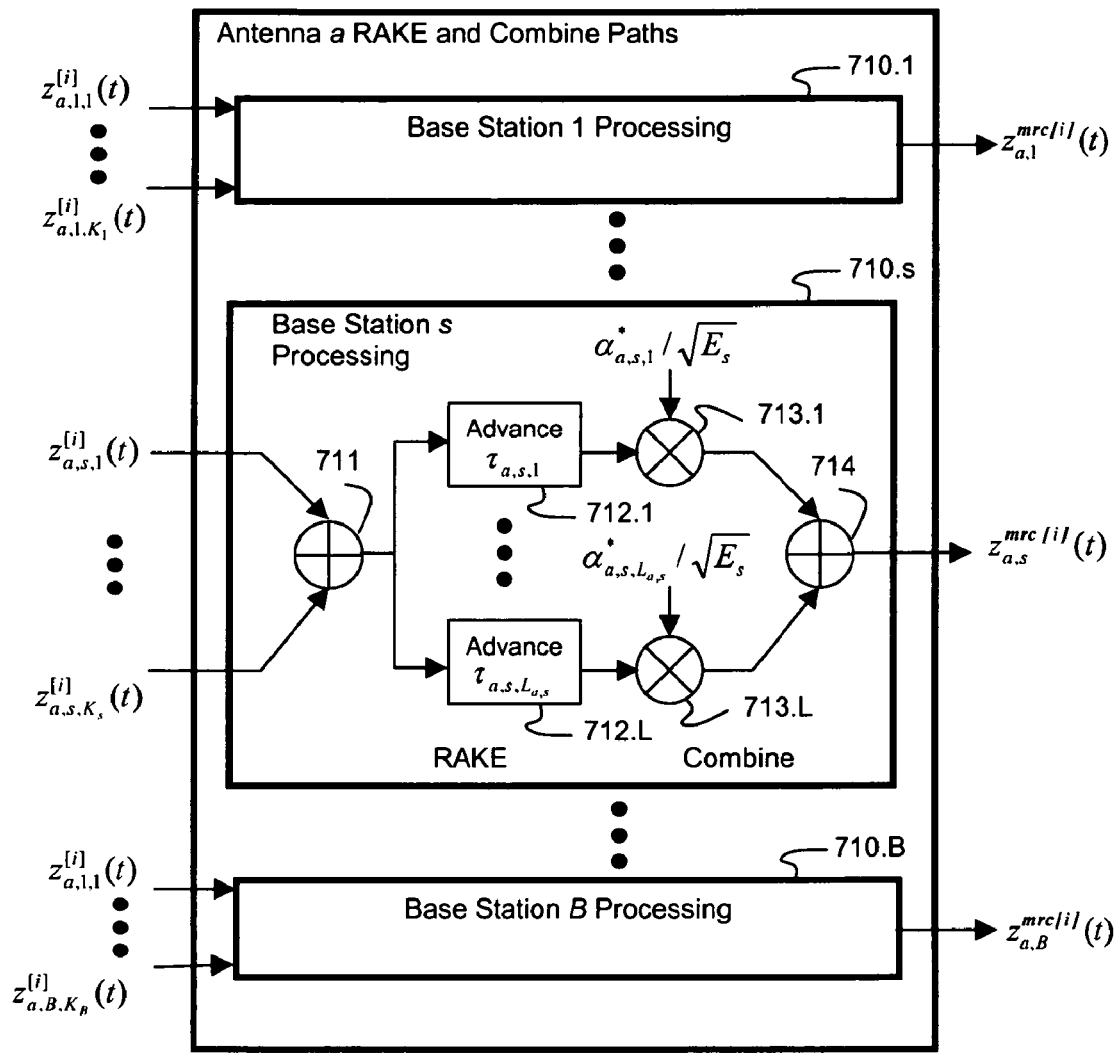
FIG. 7b is a block diagram illustrating per-antenna RAKE processing and combining on interference-cancelled subchannel constituent signals.

FIG. 7a is a block diagram of an apparatus configured for performing RAKE processing and combining 405.1-405.A on the interference-cancelled constituent signals for each antenna. Each of a plurality B of Rake processors 701.1-701.B is configured for processing finger constituents for each base station. Processor 701.s shows components that are common to all of the processors 701.1-701.B. A plurality L of time-advance modules 702.1-702.L advance finger signal inputs by multipath time shifts. Scaling modules 703.1-703.L scale the time-shifted inputs by complex channel gains, and the resulting scaled signals are summed 704 to yield the maximal ratio combined (MRC) output $$z_{a,s}^{mrc,[i]}(t) = \frac{1}{\sqrt{E_s}} \sum_{l=1}^{L_{a,s}} \alpha_{a,s,l}^* z_{a,s,l}(t - \tau_{a,s,l}) \quad \text{Equation 12}$$

associated with antenna a and base station s,

In FIG. 7b, Rake processors 710.1-710.B may each comprise a combiner 711 configured for summing the subchannel constituent signals, a plurality L of time-advance modules 712.1-712.L configured for advancing the sum by multipath time offsets, scaling modules 713.1-713.L configured for scaling the sum by corresponding multipath channel gains, and a combiner 714 configured for summing the scaled signals to produce the MRC output $$z_{a,s}^{mrc,[i]}(t) = \frac{1}{\sqrt{E_s}} \sum_{l=1}^{L_{a,s}} \alpha_{a,s,l}^* \sum_{k=1}^{K_s} z_{a,s,k}(t - \tau_{a,s,l}) \quad \text{Equation 13}$$

associated with antenna a and base station s.

Figure 8:
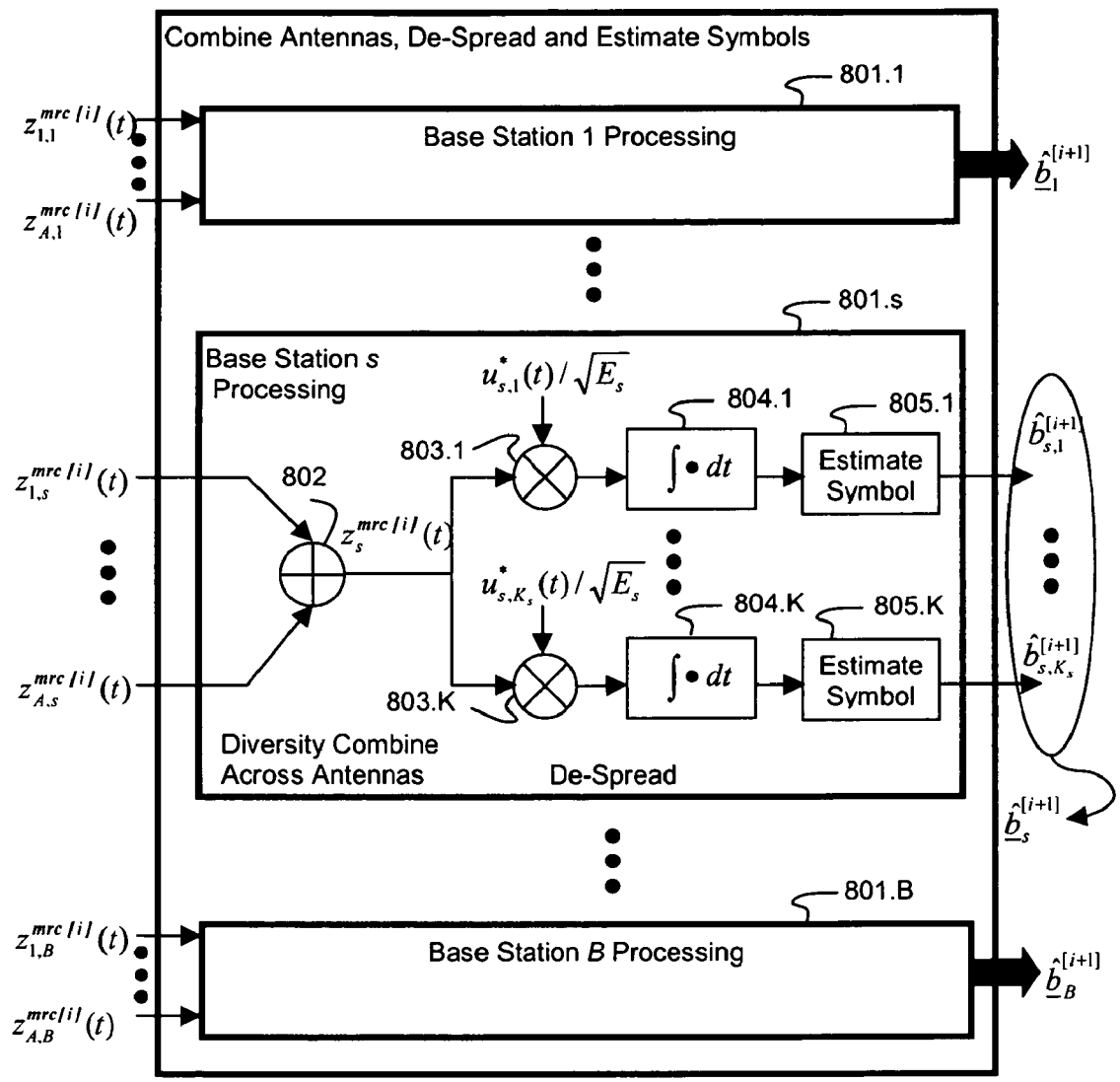
FIG. 8 is a block diagram illustrating antenna combining, de-spreading, and symbol estimation in an ICU.

FIG. 8 shows an apparatus configured for performing the steps 406.1-406.B shown in FIG. 4 to produce the updated symbol estimates. Each of a plurality B of processors 801.1-801.B is configured for processing the MRC outputs. Processor 801.s shows details that are common to all of the processors 801.1-801.B.

For each base station, the MRC signals for all antennas are summed 802 to form the overall MRC signal $$z_s^{mrc,[i]}(t) \equiv \sum_{a=1}^{A} z_{a,s}^{mrc,[i]}(t), \quad \text{Equation 14}$$

which is resolved by code multipliers 803.1-803.K and integrators 804.1-804.K onto the subchannel code waveforms. Symbol estimators 805.1-805.K are employed for producing symbol estimates, such as mixed-decision symbol estimates as described in U.S. patent application Ser. No. 11/451,932.

Because of the linear nature of many of the ICU components, alternative embodiments of the invention may comprise similar components employed in a different order of operation without affecting the overall functionality. In one embodiment, antenna combining and de-spreading may be performed prior to interference cancellation, such as illustrated in FIG. 9.

Figure 9A:
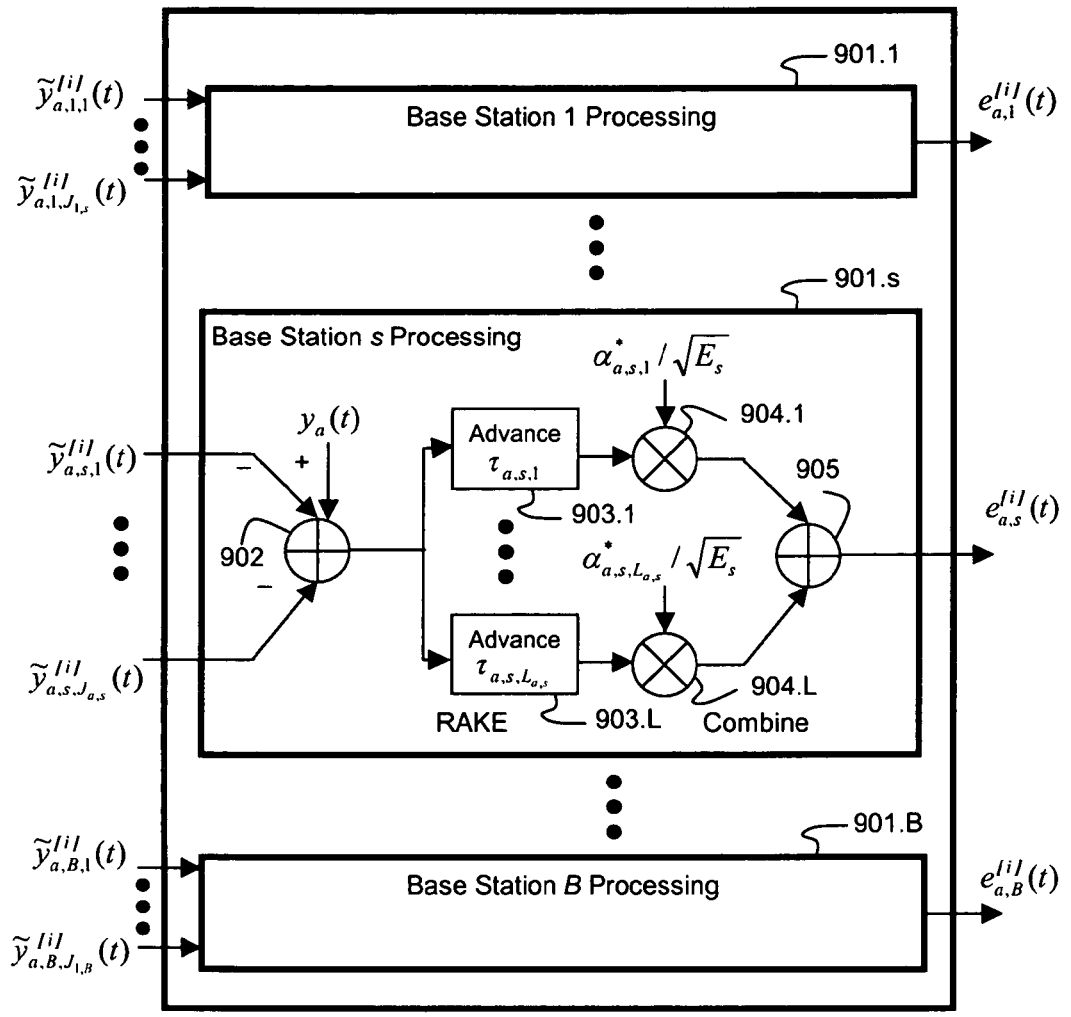
FIG. 9a is a block diagram illustrating an ICU wherein subtractive cancellation is performed after signal de-spreading.

FIG. 9a illustrates a plurality of processing blocks 901.1-901.B configured for processing constituent finger or subchannel signals received from each of a plurality of base stations. The constituent signals are subtracted from the received signal on antenna a by a subtraction module 902 to produce a residual signal. The residual signal is processed by a RAKE 903.1-903.L and maximal ratio combiner (comprising weighting modules 904.1-904.L and an adder 905) to produce an error signal $e_{a,s}^{[i]}(t)$ for antenna a and base station s.

Figure 9B:
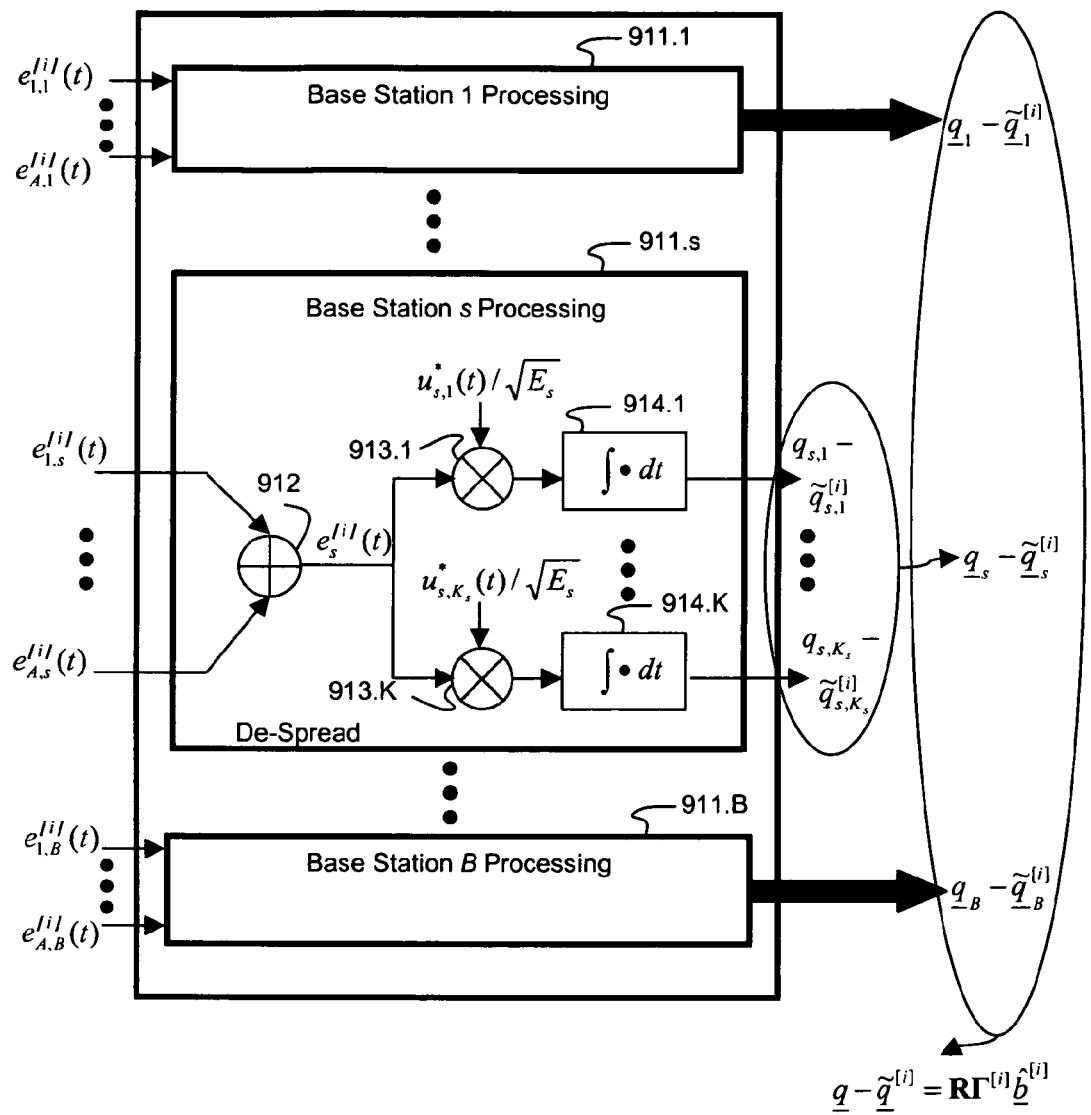
FIG. 9b shows an alternative embodiment of an ICU configured for performing subtractive cancellation after signal de-spreading.

In FIG. 9b, each of a plurality of processing blocks 911.1-911.B is configured to combine the error signals produced by the apparatus shown in FIG. 9a. In processing block 911.s, a combiner 912 combines the error signals corresponding to the $s^{th}$ base station across the antennas to produce $e_s^{[i]}(t)$, the error signal for base station s. Despreaders comprising code multipliers 913.1-913.K and integrators 914.1-914.K resolve the error signal $e_s^{[i]}(t)$ onto code waveforms of subchannels associated with the $s^{th}$ base station.

The output for the $k^{th}$ subchannel of base station s is $$\int_0^T u_k^*(t) e_s^{[i]}(t) dt,$$

which is equal to $q_{s,k} - \tilde{q}s,k^{[i]}$, where $q_{s,k}$ is defined in Equation 4, and $$\tilde{q}_{s,k}^{[i]} = \frac{1}{E_s} \sum_{a=1}^{A} \int_0^T u_k^*(t) \sum_{l=1}^{L_{a,s}} \alpha_{a,s,l}^* \sum_{j=1}^{J_{a,s}} \tilde{y}_{a,s,j}(t - \tau_{a,s,l}) dt$$

For each base station, the values $q_{s,k}$ and $\tilde{q}_{s,k}^{[i]}$ may be stacked into a vector over the subchannel index k to form $\underline{q}_s$–$\underline{\tilde{q}}_s^{[i]}$. These likewise may be stacked into a single vector over the base station index s to give $\underline{q}$–$\underline{\tilde{q}}^{[i]}$. This quantity may also be determined explicitly using a matrix multiplication.

Figure 9C:
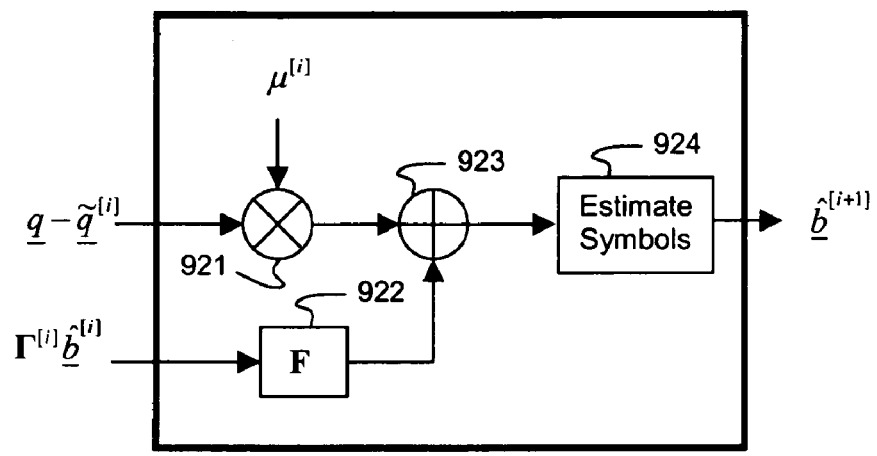
FIG. 9c shows another embodiment of an ICU.

FIG. 9c illustrates a final step of an interference-cancellation process. A stabilizing step size module 921 scales the difference $\underline{q}$–$\underline{\tilde{q}}^{[i]}$ by a stabilizing step size $\mu^{[i]}$, and the result is added 923 to the weighted input vector $\Gamma^{[i]}\underline{\hat{b}}^{[i]}$ after being multiplied 922 by implementation matrix F to produce a vector sum. The value of the implementation matrix F depends on whether finger or subchannel constituents are used. A symbol estimator 924 produces symbol estimates for each element of the vector sum.

Figure 10:
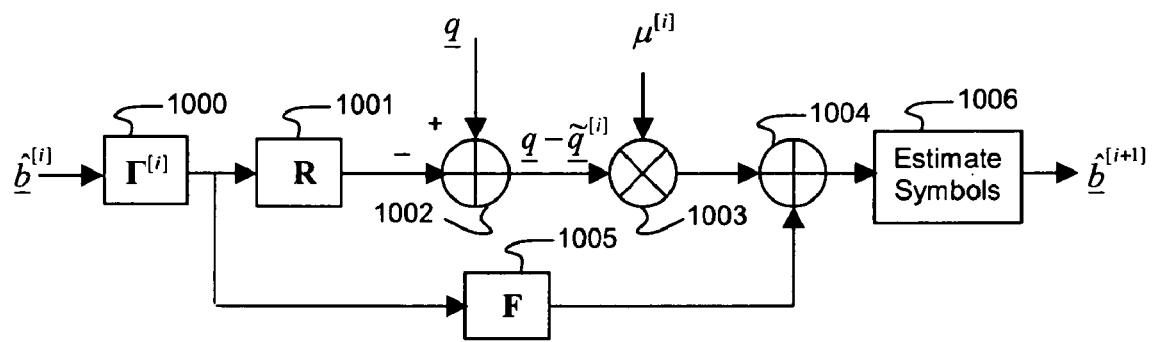
FIG. 10 is a block diagram of an ICU configured for an explicit implementation.

An explicit implementation of an ICU is illustrated in FIG. 10. The input symbol estimates are weighted 1000 and multiplied by a matrix R 1001. The resulting product is subtracted 1002 from front-end vector $\underline{q}$ and scaled with the stabilizing step size $\mu^{[i]}$ by a stabilizing step size module 1003. The resulting scaled signal is summed 1004 with weighted symbol estimates multiplied 1005 by the implementation matrix F to produce a vector sum. A symbol estimator 1006 makes decisions on the vector sum.

Matrix R is the correlation matrix for all subchannels at the receiver after combining across antennas. It may be evaluated by $$R = \sum_{a=1}^{A} R_a \qquad \text{Equation 15}$$

where $R_a$ is the correlation matrix for all subchannels at the $a^{th}$ antenna, and it may be determined as described in U.S. patent application Ser. No. 11/451,932 for a single antenna receiver. The matrix F is either the identity matrix when subchannel constituent signals are employed or the correlation matrix for all subchannels at the transmitter(s) when finger constituent signals are used, such as described in U.S. patent application Ser. No. 11/451,932. This functionality may be represented by the one-step matrix-update equation $$\underline{\hat{b}}^{[i+1]} = \Psi(\mu^{[i]}(\underline{q} - R\Gamma^{[i]}\underline{\hat{b}}^{[i]})), \qquad \text{Equation 16}$$

where $\Psi(\cdot)$ represents any function that returns a symbol estimate for each element of its argument (including, for example, any of the mixed-decision symbol estimation functions described in U.S. patent application Ser. No. 11/451,932) and all other quantities as previously described.

The stabilizing step size $\mu^{[i]}$ may take any of the forms described in U.S. patent application Ser. No. 11/451,932 that depend on the correlation matrix R, the implementation matrix F, and the weighting matrix $\delta^{[i]}$. Two of these forms of $\mu^{[i]}$ are implicitly calculable, such as described in U.S. patent application Ser. No. 11/451,932 for a single receive antenna.

Figure 11A:
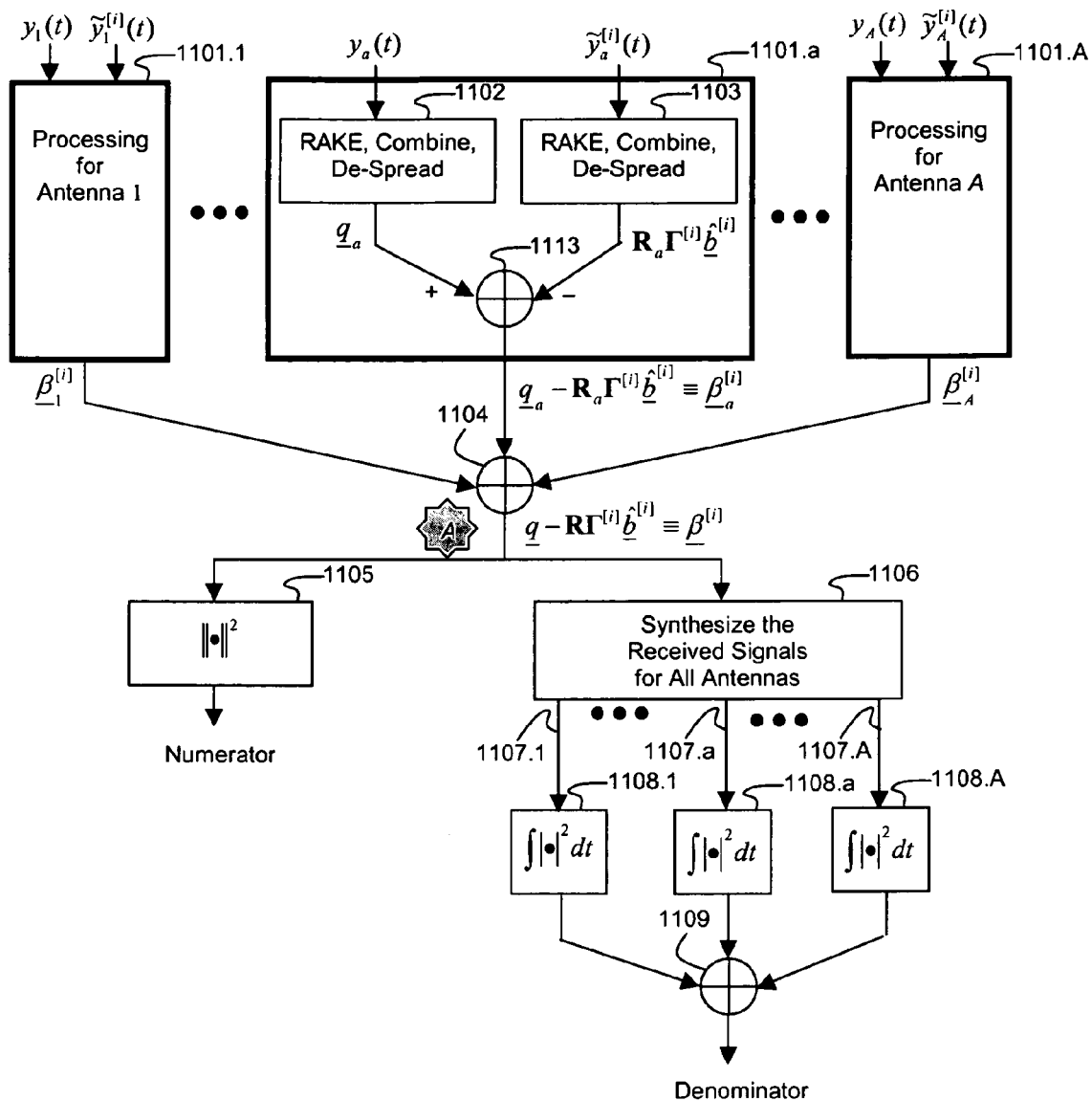
FIG. 11a is a block diagram illustrating a method for evaluating a stabilizing step size implicitly in hardware.
Figure 11B:
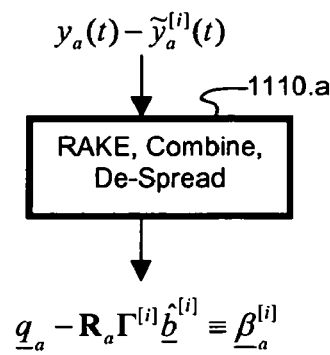
FIG. 11b is a block diagram illustrating a method for calculating a difference signal from a received signal and a synthesized received signal in accordance with certain embodiments of the invention.

FIG. 11a illustrates a method for calculating a stabilizing step size when multiple receive antennas are employed. Preliminary processing 1101.1-1101.A for each antenna provides for RAKE processing, combining, and de-spreading 1102 on the received signal, and RAKE processing, combining, and de-spreading 1103 on the synthesized received signal and produces 1113 a difference signal. In an alternative embodiment for the preliminary processing 1101.1-1101.A shown in FIG. 11b, a difference signal calculated from the received signal and the synthesized received signal undergoes RAKE processing, combining, and de-spreading 1110.a.

The difference-signal vector corresponding to the $a^{th}$ antenna is denoted by $\underline{\beta}_a^{[i]}$. The difference-signal vectors for all of the antennas are summed to produce a sum vector $\underline{\beta}^{[i]}$. A sum of the square magnitudes 1105 of the elements of the sum vector (i.e., $\|\underline{\beta}^{[i]}\|^2$) provides a numerator of a ratio from which the stabilizing step size is evaluated. The elements of $\underline{\beta}^{[i]}$ are used as transmit symbols in order to synthesize 1106 received signals for each antenna. Synthesized received signals are expressed as $$\sum_{s=1}^{B} \sum_{l=1}^{L_{a,s}} \alpha_{a,s,l}^* \sum_{k=1}^{K_s} \beta_{s,k}^{[i]} u_{s,k}(t - \tau_{a,s,l})$$

for antenna a, where $\beta_{s,k}^{[i]}$ is the $k^{th}$ element of $\underline{\beta}^{[i]}$. An integral of the square magnitude of each synthesized signal is calculated 1108.1-1108.A and summed 1109 to produce the denominator of the ratio. The ratio of the numerator and the denominator gives the first version of the step size $\mu^{[i]}$.

Figure 11C:
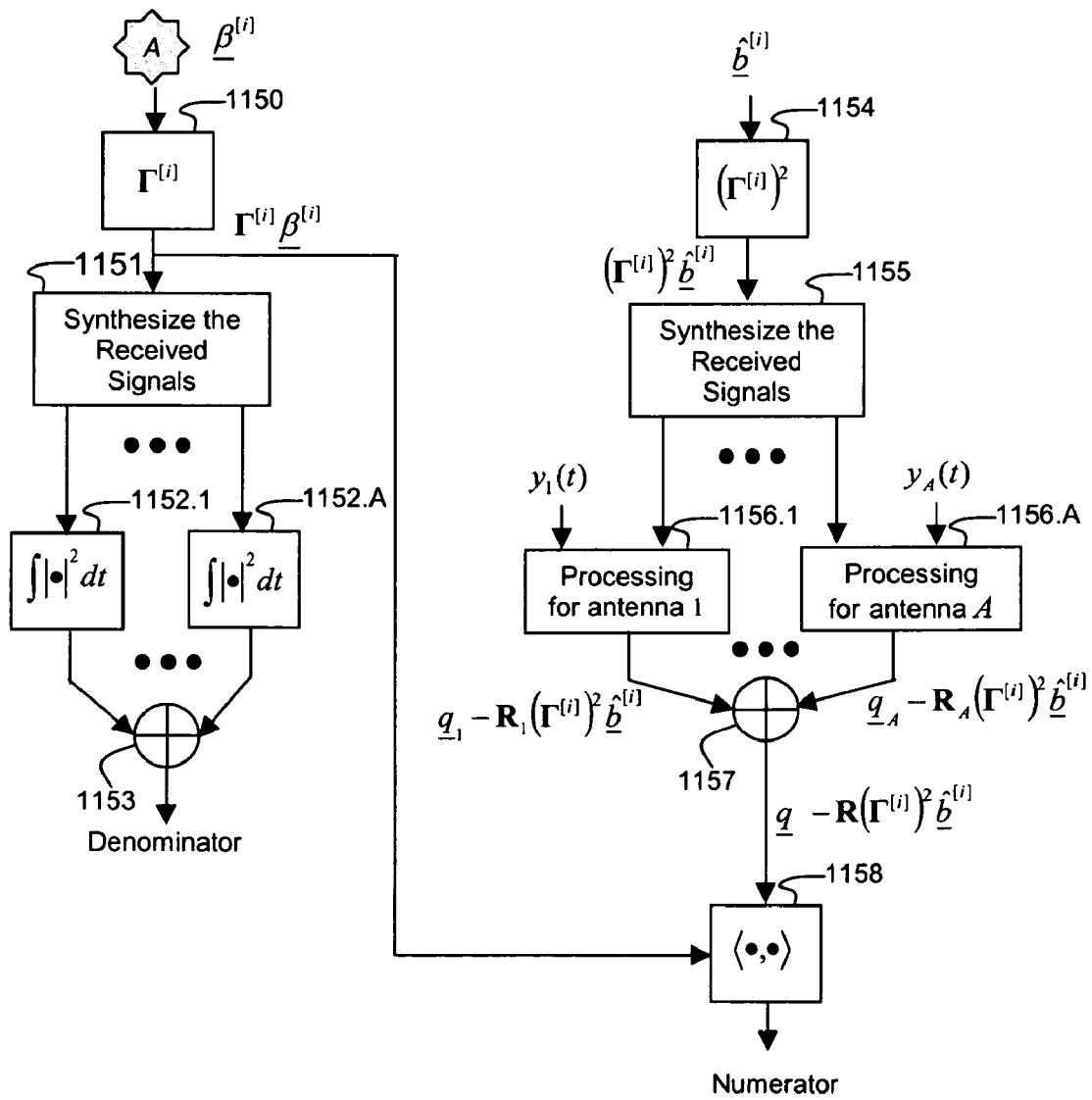
FIG. 11c is a block diagram illustrating a method for evaluating a stabilizing step size in accordance with certain embodiments of the invention.

FIG. 11c shows an implicit evaluation of the step size in accordance with another embodiment of the invention. The denominator of the ratio used to calculate the stabilizing step size is determined by weighting 1150 the vector $\underline{\beta}^{[i]}$ by soft weights (such as contained in the diagonal matrix $\Gamma^{[i]}$). The elements of the resulting weighted vector are used to produce 1151 synthesized received signals for all of the antennas. Integrals of the square magnitudes of the synthesized received signals are calculated 1152.1-1152.A and summed 1153 to provide the denominator.

The corresponding numerator is calculated by scaling 1154 symbol estimates produced at the $i^{th}$ iteration by the square of the soft weights (as contained in the diagonal matrix $(\Gamma^{[i]})^2$). The resulting scaled vector is used to synthesize 1155 received signals for all of the antennas. The synthesized signals and the received signals are processed by a parallel bank of processors 1156.1-1156.A, each corresponding to a particular antenna. The functionality of each processor 1156.1-1156.A may be equivalent to the processor 1101.a shown in FIG. 11a. The vector outputs of the processors 1156.1-1156.A are summed 1157, and the numerator is produced from the inner product 1158 of the sum vector with the weighted vector.

Explicit versions of both versions of the step size are given, respectively, by $$\mu^{[i]} = \frac{(\underline{q} - RF\Gamma^{[i]}\underline{\hat{b}}^{[i]})^H (\underline{q} - RF\Gamma^{[i]}\underline{\hat{b}}^{[i]})}{(\underline{q} - R\Gamma^{[i]}\underline{\hat{b}}^{[i]})^H R (\underline{q} - R\Gamma^{[i]}\underline{\hat{b}}^{[i]})} \qquad \text{Equation 17}$$

and $$\mu^{[i]} = \frac{(\underline{q} - R\Gamma^{[i]}F\Gamma^{[i]}\underline{\hat{b}}^{[i]})^H \Gamma^{[i]} (\underline{q} - R\Gamma^{[i]}\underline{\hat{b}}^{[i]})}{(\underline{q} - R\Gamma^{[i]}\underline{\hat{b}}^{[i]})^H (\Gamma^{[i]})^H R\Gamma^{[i]} (\underline{q} - R\Gamma^{[i]}\underline{\hat{b}}^{[i]})} \qquad \text{Equation 18}$$

wherein all quantities shown are as previously defined.

Another form of the step size in U.S. patent application Ser. No. 11/451,932 depends only on the path gains, and may be generalized to multiple receive antennas according to $$\mu^{[i]} = \mu = \max \left\{ C, \frac{\max_{s,l} \sum_{a=1}^{A} |\alpha_{a,s,l}|^p}{\sum_{a=1}^{A} \sum_{s=1}^{B} \sum_{l=1}^{L_{a,s}} |\alpha_{a,s,l}|^p} \right\},$$  Equation 19 where $\mu^{[i]}$ is fixed for every ICU and C and p are non-negative constants.

Embodiments of the invention are also applicable to the reverse-link, such as described for the single receive antenna in U.S. patent application Ser. No. 11/451,932. The primary difference (when compared to the forward-link) is that subchannels from distinct transmitters experience different multipath channels and, thus, the receiver must accommodate each subchannel with its own RAKE/Combiner/De-Spreader, and channel emulation must take into account that, in general, every subchannel sees its own channel. Such modifications are apparent to those knowledgeable in the art.

Embodiments of the invention may be realized in hardware or software and there are several modifications that can be made to the order of operations and structural flow of the processing. Those skilled in the art should recognize that method and apparatus embodiments described herein may be implemented in a variety of ways, including implementations in hardware, software, firmware, or various combinations thereof. Examples of such hardware may include Application Specific Integrated Circuits (ASICs), Field Programmable Gate Arrays (FPGAs), general-purpose processors, Digital Signal Processors (DSPs), and/or other circuitry. Software and/or firmware implementations of the invention may be implemented via any combination of programming languages, including Java, C, C++, Matlab™, Verilog, VHDL, and/or processor specific machine and assembly languages.

Computer programs (i.e., software and/or firmware) implementing the method of this invention may be distributed to users on a distribution medium such as a SIM card, a USB memory interface, or other computer-readable memory adapted for interfacing with a consumer wireless terminal. Similarly, computer programs may be distributed to users via wired or wireless network interfaces. From there, they will often be copied to a hard disk or a similar intermediate storage medium. When the programs are to be run, they may be loaded either from their distribution medium or their intermediate storage medium into the execution memory of a wireless terminal, configuring an onboard digital computer system (e.g. a microprocessor) to act in accordance with the method of this invention. All these operations are well known to those skilled in the art of computer systems.

The functions of the various elements shown in the drawings, including functional blocks labeled as "modules" may be provided through the use of dedicated hardware, as well as hardware capable of executing software in association with appropriate software. When provided by a processor, the functions may be performed by a single dedicated processor, by a shared processor, or by a plurality of individual processors, some of which may be shared. Moreover, explicit use of the term "processor" or "module" should not be construed to refer exclusively to hardware capable of executing software, and may implicitly include, without limitation, digital signal processor OSP hardware, read-only memory (ROM) for storing software, random access memory (RAM), and non-volatile storage. Other hardware, conventional and/or custom, may also be included. Similarly, the function of any component or device described herein may be carried out through the operation of program logic, through dedicated logic, through the interaction of program control and dedicated logic, or even manually, the particular technique being selectable by the implementer as more specifically understood from the context.

The method and system embodiments described herein merely illustrate particular embodiments of the invention. It should be appreciated that those skilled in the art will be able to devise various arrangements, which, although not explicitly described or shown herein, embody the principles of the invention and are included within its spirit and scope. Furthermore, all examples and conditional language recited herein are intended to be only for pedagogical purposes to aid the reader in understanding the principles of the invention. This disclosure and its associated references are to be construed as applying without limitation to such specifically recited examples and conditions. Moreover, all statements herein reciting principles, aspects, and embodiments of the invention, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

We claim:

1. An interference canceller for canceling at least one of inter-cell and intra-cell interference in multiple-access communication signals received by a plurality of antennas, comprising:
  a front-end processing module configured for generating input symbol decisions; and
  one or more interference cancellation units configured for processing the input symbol decisions, each of the one or more interference cancellation units comprising one or more of a soft-weighting module, a mixed-decision module, and a stabilizing step-size module to convert the input symbol decisions into updated symbol decisions;
  wherein at least one of the one or more interference cancellation units comprises a stabilizing step-size module, the stabilizing step-size module comprising:
  a stabilizing step size calculation module configured to generate a stabilizing step size having a magnitude indicative of how far the input symbol decisions are from desired interference-cancelled symbol decisions in an iteration of an iterative cancellation process; and
  a weighting module configured for weighting one or more error signals with the stabilizing step size.

2. The interference canceller of claim 1, wherein at least one of the interference cancellation units comprises two or more of a soft-weighting module, a mixed-decision module, and a stabilizing step-size module to convert the input symbol decisions into updated symbol decisions.

3. The interference canceller of claim 1, wherein the calculation module is configured to calculate the stabilizing step size as a ratio of distance measures between received signals combined across the plurality of antennas and synthesized received signals combined across the plurality of antennas.

4. The interference canceller of claim 1, wherein the stabilizing step size is characterized by $$\mu^{[i]} = \frac{\left(q - RF\Gamma^{[i]}\hat{b}^{[i]}\right)^H \left(q - RF\Gamma^{[i]}\hat{b}^{[i]}\right)}{\left(q - R\Gamma^{[i]}\hat{b}^{[i]}\right)^H R\left(q - R\Gamma^{[i]}\hat{b}^{[i]}\right)}$$

wherein $\mu^{[i]}$ is a stabilizing step size after an $i^{th}$ iteration of the interference canceller; $q$ is a vector of despread received signals that have been combined across the plurality of antennas, $\mu^{[i]}$ is a scalar stabilizing step, $\Gamma^{[i]}$ is a weighting matrix used for scaling the input symbol decisions, R is a correlation matrix for received signals combined across the plurality of antennas, and is a sum of a per-antenna received signal correlation matrices; F is an implementation matrix comprising an identity matrix or a transmit-signal correlation matrix; $\Gamma^{[i]}$ is a diagonal soft-weighting matrix that weights symbol estimates $\hat{b}^{[i]}$; and superscript H denotes complex-conjugate matrix transposition.

5. The interference canceller of claim 1, wherein the calculation module is configured to calculate the stabilizing step size as a ratio of distance measures between received signals combined across the plurality of antennas and two differently synthesized received signals for each antenna that are combined across the plurality of antennas.

6. The interference canceller of claim 5,
wherein the stabilizing step size comprises a ratio, the ratio comprising a numerator and a denominator;
wherein the one or more error signals each correspond to one of the plurality of antennas and are evaluated as a difference between a received signal on one of the plurality of antennas and a first synthesized received signal;
wherein the denominator of the ratio is calculated by:
scaling the first total error vector with one or more soft weights to produce a scaled error vector;
producing synthesized signals that would be received on the antennas in response to elements of the scaled error vector if employed as symbols at the one or more transmit sources using a signal basis for the one or more transmit sources;
integrating square magnitudes of the synthesized signals to produce integrated signals; and
summing the integrated signals; and
wherein the numerator of the ratio is calculated as an inner product between the first total error vector scaled by the one or more soft weights and the second total error vector.

7. The interference canceller of claim 5, wherein the calculation module further is configured for:
resolving each of the one or more error signals onto a signal basis for one or more transmit sources to produce one or more first error vectors, each first error vector corresponding to one of the plurality of antennas;
summing the one or more first error vectors to produce a first total error vector;
scaling the input symbol decisions by a square of one or more soft weights to produce scaled input symbol decisions;
synthesizing signals that would be received by the plurality of antennas in response to the scaled input symbol decisions if employed as symbols at the one or more transmit sources using a signal basis for all symbol sources in the channel;
evaluating for each of the plurality of antennas, a difference between the received signal and the synthesized signal to produce an error signal for each antenna;
resolving the error signal for each antenna onto a signal basis for the one or more transmit sources to produce one or more second error vectors; and
summing together the one or more second error vectors to produce a second total error vector.

8. The interference canceller of claim 5, wherein the stabilizing step size is characterized by $$\mu^{[i]} = \frac{\left(\underline{q} - R\Gamma^{[i]}F\Gamma^{[i]}\underline{\hat{b}}^{[i]}\right)^H \Gamma^{[i]}\left(\underline{q} - R\Gamma^{[i]}\underline{\hat{b}}^{[i]}\right)}{\left(\underline{q} - R\Gamma^{[i]}\underline{\hat{b}}^{[i]}\right)^H (\Gamma^{[i]})^H R\Gamma^{[i]}\left(\underline{q} - R\Gamma^{[i]}\underline{\hat{b}}^{[i]}\right)}$$

wherein $\mu^{[i]}$ is a stabilizing step size after an $i^{th}$ iteration of interference cancellation; q is a vector of despread received signals that have been combined across the plurality of antennas, $\mu^{[i]}$ is a scalar stabilizing step, $\Gamma^{[i]}$ is a weighting matrix used for scaling the input symbol decisions, R is a correlation matrix for received signals combined across the plurality of antennas and is a sum of a per-antenna received signal correlation matrices; F is an implementation matrix comprising an identity matrix or a transmit-signal correlation matrix; $\Gamma^{[i]}$ is a diagonal soft-weighting matrix that weights elements of a soft-decision vector $\hat{b}$; and superscript H denotes complex-conjugate matrix transposition.

9. The interference canceller of claim 1, wherein the stabilizing step is measured as a function of channel quality parameters.

10. The interference canceller of claim 9, wherein the stabilizing step size is characterized by $$\mu^{[i]} = \mu = \max\left\{C, \frac{\max_{s,l}\sum_{a=1}^{A}|\alpha_{a,s,l}|^p}{\sum_{a=1}^{A}\sum_{s=1}^{B}\sum_{l=1}^{L_{a,s}}|\alpha_{a,s,l}|^p}\right\}$$

where $\mu$ is a stabilizing step size fixed for every iteration, A is a number of the plurality of antennas, B is a number of base stations, $L_{a,s}$ is a number of multipaths from an $s^{th}$ base station as seen by antenna a, $\alpha_{a,s,l}$ is a multipath gain corresponding to an $l^{th}$ path from an $s^{th}$ base station as seen by antenna a, max { } denotes a maximum function, and C and p are non-negative constants.

11. The interference canceller of claim 1, wherein the stabilizing step is set equal to a predetermined fixed value.

12. The interference canceller of claim 1, wherein the front-end processing module comprises:
a combiner configured for combining the received signals from each of one or more transmission sources across the plurality of antennas for producing a combined signal;
a despreader configured for resolving the combined signal onto a signal basis for the one or more transmission sources to produce soft symbol estimates from the one or more transmission sources; and
a symbol estimator configured for performing a mixed decision on each of the soft symbol estimates to generate the input symbol decisions.

13. The interference canceller of claim 12, further configured for canceling interference from each of a plurality of base stations.

14. The interference canceller of claim 12, wherein each of the one or more interference-cancellation units is configured for processing signals received by each of the plurality of antennas to produce a plurality of resolved error signals.

15. The interference canceller of claim 14, wherein the plurality of resolved error signals is produced by adding constituent signals for each of the plurality of antennas to corresponding scaled error signals to produce error signals for the one or more transmission sources, and resolving the error signals for the one or more transmission sources across the plurality of antennas onto the signal basis for the one or more transmission sources.

16. The interference canceller of claim 15, wherein the constituent signals comprise Rake-finger signals.

17. The interference canceller of claim 16, further comprising:
a synthesizer configured for synthesizing estimated Rake finger signals for each antenna that would be received if weighted symbol decisions were employed at the one or more transmission sources; and
a subtraction module configured for performing per-antenna subtraction of a sum of synthesized Rake finger signals from that antenna's received signal to produce an error signal.

18. The interference canceller of claim 14, wherein the constituent signals comprise received signals associated with each of the one or more transmission sources.

19. The canceller of claim 12, further comprising:
a despreader configured to resolve each of a plurality of error signals corresponding to each of a plurality of antennas onto a signal basis for the one or more transmission sources for producing a plurality of resolved error signals;
a first combiner configured for combining the resolved error signals across antennas for producing a combined signal;
a stabilizing step-size module configured to scale the combined signal by a stabilizing step size for producing a scaled signal; and
a second combiner configured for combining the combined signal with a weighted input vector.

20. The canceller of claim 12, configured to reside in at least one of a set of devices, the set comprising a subscriber-side device configured for processing forward-link signals and a server-side device for processing reverse-link signals.

21. An interference cancellation method for canceling at least one of inter-cell and intracell interference in multiple-access communication signals received by a plurality of antennas, the method comprising:
processing one or more received signals in a front-end processor to generate input symbol decisions; and
performing iterative interference cancellation to process the input symbol decisions, the iterative interference cancellation comprising one or more of soft weighting, performing mixed decisions, and scaling by a stabilizing step-size to convert the input symbol decisions into updated symbol decisions;
wherein the step of iterative interference cancellation comprises scaling by a stabilizing step-size, scaling by a stabilizing step size comprising:
generating a stabilizing step size having a magnitude indicative of how far the input symbol decisions are from desired interference-cancelled symbol decisions in an iteration of the iterative interference cancellation; and
weighting an error signal with the stabilizing step size.

22. The method of claim 21, wherein the step of performing iterative interference cancellation comprises two or more of soft weighting, performing mixed decisions, and scaling by a stabilizing step-size to convert the input symbol decisions into updated symbol decisions.

23. The method of claim 21, wherein generating a stabilizing step size comprises calculating the stabilizing step size as a ratio of distance measures between received signals combined across the plurality of antennas and synthesized received signals combined across the plurality of antennas.

24. The method of claim 23, wherein the stabilizing step size comprises a ratio, the ratio comprising a numerator and a denominator,
wherein the numerator of the ratio is calculated by:
evaluating for a particular antenna an error signal as a difference between a received signal on the particular antenna and a synthesized received signal for the particular antenna;
resolving the error signal onto a signal basis for one or more transmit sources by employing Rake reception;
maximal ratio combining;
despreading to produce an error vector;
summing together error vectors from the plurality of antennas to produce a total error vector; and
summing square magnitudes of elements of the total error vector; and
wherein the denominator is calculated by:
synthesizing for each of the plurality of antennas, a signal that would be received in response to elements of the total error vector being employed as symbols at the one or more transmit sources, using a signal basis for the one or more transmit sources;
evaluating an integral of square magnitude for each synthesized antenna signal for producing a plurality of integrals; and
summing together the integrals over the plurality of antennas.

25. The method of claim 24, wherein the stabilizing step size is characterized by $$\mu^{[i]} = \frac{\left(\underline{q} - RF\Gamma^{[i]}\underline{\hat{b}}^{[i]}\right)^H \left(\underline{q} - RF\Gamma^{[i]}\underline{\hat{b}}^{[i]}\right)}{\left(\underline{q} - R\Gamma^{[i]}\underline{\hat{b}}^{[i]}\right)^H R\left(\underline{q} - R\Gamma^{[i]}\underline{\hat{b}}^{[i]}\right)}$$

wherein $\mu^{[i]}$ is a stabilizing step size after an $i^{th}$ iteration of the interference canceller; $\underline{q}$ is a vector of despread received signals that have been combined across the plurality of antennas, $\mu^{[i]}$ is a scalar stabilizing step, $\Gamma^{[i]}$ is a weighting matrix used for scaling the input symbol decisions, R is a correlation matrix for received signals combined across the plurality of antennas, and is a sum of a per-antenna received signal correlation matrices; F is an implementation matrix comprising an identity matrix or a transmit-signal correlation matrix; $\Gamma^{[i]}$ is a diagonal soft-weighting matrix that weights symbol estimates $\underline{\hat{b}}^{[i]}$; and superscript H denotes complex-conjugate matrix transposition.

26. The method of claim 21, wherein generating a stabilizing step size is configured to calculate the stabilizing step size as a ratio of distance measures between received signals combined across the plurality of antennas and two differently synthesized received signals for each antenna that are combined across the plurality of antennas.

27. The method of claim 26,
wherein the stabilizing step size comprises a ratio, the ratio comprising a numerator and a denominator;
wherein the error signal comprises a plurality of error signals, each corresponding to one of the plurality of antennas and being evaluated as a difference between a received signal on one of the plurality of antennas and a first synthesized received signal;
wherein the denominator of the ratio is calculated by:
scaling the first total error vector with the soft weights to produce a scaled error vector;
producing synthesized signals that would be received on the antennas in response to elements of the scaled error vector if employed as symbols at the one or more transmit sources using a signal basis for the one or more transmit sources; and integrating square magnitudes of the synthesized signals to produce integrated signals and summing the integrated signals; and wherein the numerator of the ratio is calculated as an inner product between the first total error vector scaled by the soft weights and the second total error vector.

28. The method of claim 26, wherein the calculation module further is configured for resolving each of the plurality of error signals onto a signal basis for one or more transmit sources to produce one or more error vectors, each error vector corresponding to one of the plurality of antennas; summing the one or more error vectors to produce a first total error vector;

scaling the input symbol decisions by a square of the soft weights;

synthesizing signals that would be received by the plurality of antennas in response to the scaled input symbol decisions if employed as symbols at the one or more transmit sources using a signal basis for all symbol sources in the channel;

evaluating for each of the plurality of antennas, a difference between the received signal and the synthesized signal to produce an error signal for each antenna;

resolving the error signal onto a signal basis for the one or more transmit sources to produce a second error vector; and summing together a plurality of second error vectors from the plurality of antennas to produce a second total error vector.

29. The method of claim 26, wherein the stabilizing step size is characterized by $$\mu^{[i]} = \frac{\left(\underline{q} - R\Gamma^{[i]}F\Gamma^{[i]}\underline{\hat{b}}^{[i]}\right)^H \Gamma^{[i]}\left(\underline{q} - R\Gamma^{[i]}\underline{\hat{b}}^{[i]}\right)}{\left(\underline{q} - R\Gamma^{[i]}\underline{\hat{b}}^{[i]}\right)^H (\Gamma^{[i]})^H R\Gamma^{[i]}\left(\underline{q} - R\Gamma^{[i]}\underline{\hat{b}}^{[i]}\right)}$$

wherein $\mu^{[i]}$ is a stabilizing step size after an $i^{th}$ iteration of interference cancellation; $\underline{q}$ is a vector of despread received signals that have been combined across the plurality of antennas, $\mu^{[i]}$ is a scalar stabilizing step, $\Gamma^{[i]}$ is a weighting matrix used for scaling the input symbol decisions, R is a correlation matrix for received signals combined across the plurality of antennas and is a sum of a per-antenna received signal correlation matrices; F is an implementation matrix comprising an identity matrix or a transmit-signal correlation matrix; $\Gamma^{[i]}$ is a diagonal soft-weighting matrix that weights elements of a soft-decision vector $\underline{\hat{b}}^{[i]}$; and superscript H denotes complex-conjugate matrix transposition.

30. The method of claim 21, wherein the stabilizing step is measured as a function of channel quality parameters.

31. The method of claim 30, wherein the stabilizing step size is characterized by $$\mu^{[i]} = \mu = \max\left\{C, \frac{\max_{s,l} \sum_{a=1}^{A} |\alpha_{a,s,l}|^p}{\sum_{a=1}^{A} \sum_{s=1}^{B} \sum_{l=1}^{L_{a,s}} |\alpha_{a,s,l}|^p}\right\}$$

where $\mu$ is a stabilizing step size fixed for every iteration, A is a number of the plurality of antennas, B is a number of base stations, $L_{a,s}$ is a number of multipaths from an $s^{th}$ base station as seen by antenna a, $\alpha_{a,s,l}$ is a multipath gain corresponding to an $l^{th}$ path from an $s^{th}$ base station as seen by antenna a, max { } denotes a maximum function, and C and p are non-negative constants.

32. The method of claim 21, wherein the stabilizing step is set equal to a predetermined fixed value.

33. The method of claim 21, wherein the step of processing further comprises:
combining one or more received signals from each of one or more transmission sources across the plurality of antennas to produce one or more combined signals;
resolving the one or more combined signals onto a signal basis for the one or more transmission sources to produce soft symbol estimates from the one or more transmission sources; and
performing a mixed decision on each of the soft symbol estimates to generate the input symbol decisions.

34. The method of claim 33, further configured for canceling interference from each of a plurality of base stations.

35. The method of claim 33, wherein processing by iterative interference cancellation is configured for processing signals received by each of the plurality of antennas, wherein constituent signals for each of the plurality of antennas are added to corresponding scaled error signals to produce antenna error signals for the one or more transmission sources, followed by resolving the antenna error signals for the one or more transmission sources across the plurality of antennas onto the signal basis for the one or more transmission sources.

36. The method of claim 35, wherein the constituent signals comprise Rake-finger signals.

37. The method of claim 36, further comprising:
synthesizing estimated Rake finger signals for each antenna that would be received if weighted symbol decisions were employed at the one or more transmission sources; and
performing per-antenna subtraction of a sum of synthesized Rake finger signals from that per-antenna received signal to produce one or more antenna error signals.

38. The method of claim 35, wherein the constituent signals comprise received signals associated with each of the one or more transmission sources.

39. The method of claim 33, further comprising:
resolving each of one or more error signals each corresponding to one of the plurality of antennas onto a signal basis for the one or more transmission sources for producing a one or more of resolved error signals;
combining the one or more resolved error signals across antennas for producing a combined signal;
scaling the combined signal by a stabilizing step size to producing a scaled signal; and
combining the combined signal with a weighted input vector.

* * * * *